(12) United States Patent
Omoto et al.

(10) Patent No.: US 7,876,842 B2
(45) Date of Patent: Jan. 25, 2011

(54) MULTICARRIER TRANSMISSION METHOD, MULTICARRIER MODULATION SIGNAL TRANSMISSION APPARATUS, MULTICARRIER MODULATION SIGNAL RECEPTION APPARATUS, MULTICARRIER MODULATION SIGNAL TRANSMISSION METHOD, AND PILOT SIGNAL GENERATION METHOD

(75) Inventors: Yukihiro Omoto, Osaka (JP); Kenichi Mori, Osaka (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 960 days.

(21) Appl. No.: 11/783,377

(22) Filed: Apr. 9, 2007

(65) Prior Publication Data
US 2008/0159423 A1   Jul. 3, 2008

(30) Foreign Application Priority Data
Apr. 14, 2006   (JP)   ............................. 2006-111759

(51) Int. Cl.
  *H04K 1/10* (2006.01)
(52) U.S. Cl. ....................................... 375/260; 375/295
(58) Field of Classification Search ................ 375/260, 375/295; 370/208, 209–210
See application file for complete search history.

(56) References Cited

U.S. PATENT DOCUMENTS

| | | | |
|---|---|---|---|
| 3,511,936 A | 5/1970 | Saltzberg | |
| 5,907,583 A * | 5/1999 | Sakoda et al. | 375/260 |
| 5,987,005 A * | 11/1999 | Fertner et al. | 370/210 |
| 6,606,296 B1 * | 8/2003 | Kokkonen | 370/203 |
| 6,810,020 B2 * | 10/2004 | Cho et al. | 370/253 |
| 6,876,672 B1 * | 4/2005 | Castelain | 370/483 |
| 6,976,672 B2 * | 12/2005 | Kawata | 271/9.11 |
| 2002/0136157 A1 * | 9/2002 | Takaoka et al. | 370/208 |
| 2006/0203821 A1 * | 9/2006 | Mizusawa et al. | 370/392 |
| 2006/0239370 A1 * | 10/2006 | Mody et al. | 375/260 |

FOREIGN PATENT DOCUMENTS

| | | |
|---|---|---|
| JP | 2005-303960 | 10/2005 |
| JP | 2005-311413 | 11/2005 |

OTHER PUBLICATIONS

"Data Transmission by Frequency-Division Multiplexing Using the Discrete Fourier Transform", IEEE Transaction on Communications, vol. COM-19, pp. 628-634, Oct. 1971.

(Continued)

*Primary Examiner*—Emmanuel Bayard
(74) *Attorney, Agent, or Firm*—Wenderoth, Lind & Ponack, L.L.P.

(57) ABSTRACT

In a transmitter, at least one pilot carrier which is modulated with a signal sequence including a reference pilot signal sequence represented by any of amplitude modulation vectors $\{\alpha, \alpha, -\alpha, -\alpha\}$, $\{\alpha, -\alpha, -\alpha, \alpha\}$, $\{-\alpha, \alpha, \alpha, -\alpha\}$, and $\{-\alpha, -\alpha, \alpha, \alpha\}$ where $\alpha$ represents a real number other than 0, is generated, and an OFDM/OQAM multicarrier modulation signal is transmitted. In a receiver, the OFDM/OQAM multicarrier modulation signal is demodulated, and transmission channel characteristics are estimated and corrected based on two successive demodulation vectors in a time direction which are obtained by demodulating the pilot carrier.

14 Claims, 18 Drawing Sheets

OTHER PUBLICATIONS

"Performance of an Efficient Parallel Data Transmission System", IEEE Transaction on Communications, vol. COM-15, pp. 805-811, Dec. 1967.

"Time-Limited Orthogonal Multicarrier Modulation Schemes", IEEE Transactions on Communications, vol. 43, pp. 1269-1272, Feb./Mar./Apr. 1995.

"DMT Systems, DWMT Systems and Digital Filter Banks", IEEE International Conference on Communications, pp. 311-315, May 1994.

"Extended Lapped Transforms: Properties, Applications, and Fast Algorithms", IEEE Transactions on Signal Processing, vol. 40, No. 11, pp. 2703-2714, Nov. 1992.

* cited by examiner

MULTICARRIER TRANSMISSION METHOD, MULTICARRIER MODULATION SIGNAL TRANSMISSION APPARATUS, MULTICARRIER MODULATION SIGNAL RECEPTION APPARATUS, MULTICARRIER MODULATION SIGNAL TRANSMISSION METHOD, AND PILOT SIGNAL GENERATION METHOD

BACKGROUND OF THE INVENTION

1. Field of the Invention

The present invention relates to a method for estimating transmission channel characteristics using a pilot signal, and more particularly, to an estimation method suitable for a multicarrier modulation scheme.

2. Description of the Background Art

In wireless or wired communications, multicarrier modulation is widely used. The multicarrier modulation scheme is a method for dividing and assigning transmission data to a plurality of carriers and modulating and multiplexing the carriers with the respective assigned pieces of the transmission data. OFDM (Orthogonal Frequency Division Multiplexing), which is a type of multicarrier modulation scheme, is widely in practical use in fields, such as digital terrestrial television broadcasting, wireless LAN (Local Area Network), xDSL (x Digital Subscriber Line), PLC (Power Line Communications), and the like. Examples of specific applications include DVB-T for digital terrestrial television broadcasting, IEEE802.11a for wireless LAN, ADSL for xDSL, HomePlug for powerline communications, and the like. This OFDM is referred to as an OFDM/QAM (Quadrature Amplitude Modulation) multicarrier modulation scheme or simply OFDM/QAM when it is distinguished from other multicarrier modulation schemes.

(OFDM/QAM)

The principle of OFDM/QAM is described in S. B. Weinstein and Paul M. Ebert, "Data Transmission by Frequency-Division Multiplexing Using the Discrete Fourier Transform", IEEE Transaction on Communications, vol. COM-19, pp. 628-634, October 1971.

OFDM/QAM is a multicarrier modulation scheme of subjecting a plurality of carriers to complex vector modulation in units of each symbol for multiplexing. A symbol interval includes a guard interval and an effective symbol interval. In wireless mobile communications, multipath propagation often disadvantageously occurs, i.e., a plurality of incoming transmission signals which are variously delayed due to reflection of radio waves are received. Since OFDM/QAM has the guard interval, differences in arrival time of a plurality of incoming waves due to multipath propagation are tolerated and orthogonality is maintained between a plurality of carriers, so that a transmission signal can be received without occurrence of inter-symbol interference or inter-carrier interference. In the field of wireless communications, such as digital terrestrial television broadcasting, wireless LAN and the like, such resistance of OFDM/QAM to multipath propagation is utilized.

However, in OFDM/QAM, the guard interval is only used for toleration of multipath propagation, but no effective information is transmitted during the guard interval. Therefore, OFDM/QAM disadvantageously has low spectral efficiency or otherwise loss. Also in OFDM/QAM, when a delay time difference due to multipath propagation exceeds the guard interval, transmission quality is rapidly deteriorated, resulting in an insufficient effect of filtering a narrow-band interference signal.

As another multicarrier modulation scheme for solving the above-described problem, an OFDM/OQAM (Offset Quadrature Amplitude Modulation) multicarrier modulation scheme is known. The OFDM/OQAM multicarrier modulation scheme is hereinafter simply referred to as OFDM/OQAM.

(OFDM/OQAM)

The principle of OFDM/OQAM is described in Burton R. Saltzberg, "Performance of an Efficient Parallel Data Transmission System", IEEE Transaction on Communications, vol. COM-15, pp. 805-811, December 1967.

OFDM/OQAM is a multicarrier modulation scheme of subjecting a plurality of carriers to amplitude modulation in units of each symbol for multiplexing. In OFDM/OQAM, a difference in modulation phase between adjacent symbols or adjacent carriers is set to be $\pi/2$ radians, and a symbol time interval Ts and a carrier frequency interval fs have a relationship represented by Ts=1/(2fs). Note that, thus, in OFDM/OQAM, amplitude modulation is applied to phase axes which alternatively become orthogonal in symbol time intervals each of which is about half of that of OFDM/QAM when the carrier frequency interval fs is the same.

Modulation schemes which have features of OFDM/OQAM and to which the present invention is applicable are all handled as OFDM/OQAM. For example, time-limited orthogonal multicarrier modulation (see R. Li and G. Stette, "Time-Limited Orthogonal Multicarrier Modulation Schemes", IEEE Transactions on Communications, vol. 43, pp. 1269-1272, February/March/April 1995), DWMT (Discrete Wavelet Multitone, see M. A. Tzannes, M. C. Tzannes, J. Proakis and P. N. Heller, "DMT Systems, DWMT Systems and Digital Filter Banks", IEEE International Conference on Communications, pp. 311-315, May 1994), extended lapped transform (see H. S. Malvar, "Extended Lapped Transforms: Properties, Applications, and Fast Algorithms", IEEE Transactions on Signal Processing, Vol. 40, Noll, pp. 2703-2714, November 1992), and a multicarrier transmission method (DWMC transmission method) which performs a digital modulation/demodulation process using a real coefficient wavelet filter bank (see Japanese Unexamined Patent Application Publication Nos. 2005-303960 (Patent Document 1) and 2005-311413 (Patent Document 2)), are regarded as being of the same type and are collectively referred to as OFDM/OQAM.

FIG. 14 is a diagram illustrating exemplary time and frequency responses of OFDM/OQAM multicarrier modulation signals. A portion (a) of FIG. 14 illustrates the time responses of the OFDM/OQAM multicarrier modulation signals, and a portion (b) of FIG. 14 illustrates the frequency responses of the OFDM/OQAM multicarrier modulation signals.

In the portion (a) of FIG. 14, the horizontal axis represents times and the vertical axis represents amplitudes. Time responses St−1, St and St+1 of three symbols of OFDM/OQAM multicarrier modulation signals are separately indicated. The duration of the time response of one symbol of OFDM/OQAM multicarrier modulation signal extends over a plurality of symbol time intervals (four Ts's in the example of the portion (a) of FIG. 14), so that the time responses of the OFDM/OQAM multicarrier modulation signals overlap each other in the time-axis direction. The time response duration of the OFDM/OQAM multicarrier modulation signals is referred to as an overlapping symbol number. Therefore, in the example of the portion (a) of FIG. 14, the overlapping symbol number is four. Here, a symbol sampling length is KM where K represents the overlapping symbol number and M represents the total number of subcarriers.

In the portion (b) of FIG. 14, the horizontal axis represents frequencies and the vertical axis represents spectral intensities. Subcarrier modulation spectrum fc1 to fc3 which are frequency responses when three subcarriers are modulated with respective pieces of transmission data are separately indicated. As can be seen from the portion (b) of FIG. 14, the subcarrier modulation spectrum fc1 to fc3 overlap each other. Thus, since the OFDM/OQAM multicarrier modulation signals overlap both in the time and frequency directions, an OFDM/OQAM modulation signal of each symbol is interfered with by OFDM/OQAM modulation signals of its preceding and succeeding symbols and its adjacent subcarriers. However, in OFDM/OQAM, since only an imaginary-axis component which is orthogonal to a real-axis component (amplitude component) which is modulation information is interfered with by an OFDM/OQAM modulation signal, OFDM/OQAM multicarrier modulation signals maintain orthogonality with each other.

On the other hand, in systems to which OFDM/QAM is applied, a frame format is used in which, in order to estimate transmission channel characteristics and frequency and phase errors between a transmitter and a receiver, and the like, a reference signal called a pilot signal which is known both in the transmitter and the receiver is inserted. An example of such a system to which OFDM/QAM is applied is a wireless LAN standard IEEE802.11a.

In OFDM/QAM, orthogonality is maintained so that there is no interference both between each symbol and between each subcarrier of OFDM/QAM modulation signals. Therefore, as illustrated in FIG. 15A, in a time-frequency plane in which OFDM/QAM modulation signals are arranged, a modulation signal can be used in which pilot signals are freely provided in units of one symbol and one subcarrier. FIG. 15B is a diagram illustrating a modulation vector and a demodulation vector of a pilot signal on a complex plane when it is assumed that no variation or noise is present in a transmission channel in OFDM/QAM. In this case, the modulation vector and the demodulation vector are equal to each other. Thus, in OFDM/QAM, since the modulation vector and the demodulation vector of a pilot signal are equal to each other under the environment that there is no variation in a transmission channel, the receiver can predict the demodulation vector of the pilot signal. A known demodulation vector in the receiver is hereinafter referred to as an ideal demodulation vector. In OFDM/QAM, by calculating the amount of a change between the ideal demodulation vector and a demodulation vector of an actually received pilot signal, transmission channel characteristics can be estimated.

However, in OFDM/OQAM, a modulation signal in which pilot signals are freely arranged in units of one symbol and one subcarrier cannot be used, as is similar to OFDM/QAM. As described above, in OFDM/OQAM, each OFDM/OQAM multicarrier modulation signal interferes with imaginary-axis components of OFDM/OQAM modulation signals of its preceding and succeeding symbols and its adjacent subcarriers. Therefore, even if a subcarrier assigned as a pilot carrier is modulated with a pilot signal having a known amplitude which includes only a real-axis component, the subcarrier is interfered with OFDM/OQAM multicarrier modulation signals of its preceding and succeeding symbol and its adjacent subcarriers, so that an imaginary-axis component occurs in the demodulation vector of the pilot signal. This will be described with reference to FIG. 16.

FIG. 16 is a diagram illustrating a range on a complex plane within which an ideal demodulation vector is present when a pilot signal including only a real-axis component having an amplitude value of "1" is received and demodulated under the environment that no variation or noise is present in a transmission channel in OFDM/OQAM. As illustrated in FIG. 16, an ideal demodulation vector of a pilot signal including only a real-axis component having an amplitude value of "1" is present anywhere on a straight line L0 of FIG. 16 and is not uniquely fixed. This is because, as described above, there is an interference from an imaginary-axis component received from OFDM/OQAM multicarrier modulation signals of preceding and succeeding symbols and adjacent subcarriers, and the amount of the interference occurring in the imaginary-axis component depends on values possessed by the OFDM/OQAM multicarrier modulation signals of the preceding and succeeding symbols and the adjacent subcarriers.

Thus, in OFDM/OQAM, even if a pilot signal having a known amplitude is transmitted as in OFDM/QAM, the ideal demodulation vector of the pilot signal has an uncertain imaginary-axis component caused by an interference from an OFDM/OQAM multicarrier modulation signal which is not known to a receiver for preceding and succeeding symbols and adjacent subcarriers, and therefore, is not uniquely fixed. Therefore, the receiver cannot obtain the amount of a change between the ideal demodulation vector of the pilot signal and a demodulation vector of an actually received pilot signal, as is similar to OFDM/QAM, so that transmission channel characteristics cannot be correctly estimated.

Methods for estimating transmission channel characteristics in OFDM/OQAM, which solves the problem, have been proposed in, for example, Patent Documents 1 and 2.

In conventional multicarrier modulation disclosed in Patent Document 1, three methods for estimating transmission channel characteristics are described. In a first method of Patent Document 1, a continuous pilot signal is used which is obtained by modulating all subcarriers over 2K−1 symbols (K represents an overlapping symbol number) with the same pilot signal.

Initially, the first method of Patent Document 1 will be described.

FIGS. 17A and 17B are conceptual diagrams illustrating a pilot signal in the first method of Patent Document 1. FIG. 17A illustrates a portion of a frame format used in the first method. FIG. 17B is a schematic diagram illustrating a relationship in frequency between spectrum of pilot signals and subcarriers. In FIG. 17A, the horizontal axis represents an arrangement of subcarriers in a frequency direction, and the vertical axis represents an arrangement of symbols in a time direction. As indicated by double hatching in FIG. 17A, in the first method, a continuous pilot signal is obtained by modulating all subcarriers over 2K−1 symbols with the same pilot signal.

In FIG. 17B, the horizontal axis represents frequencies and the vertical axis represents spectral intensities. Spectrum of the continuous pilot signal appear as emission line spectrum between subcarrier modulation spectrum. FIG. 17B illustrates, for example, only spectrum fp1 to fp3 of the continuous pilot signal. The reason why the frequency relationship between the spectrum of the continuous pilot signal and the subcarrier modulation spectrum is what is illustrated in FIG. 17B, is that, since the continuous pilot signal is composed of the same pilot signal which is repeated in the time intervals Ts, the spectrum of the continuous pilot signal repeatedly appears at intervals of 1/Ts on the frequency axis, while the frequency interval of the subcarrier modulation spectrum is 1/(2Ts).

Also, since the overlapping symbol number is K, the K-th symbol and thereafter of the continuous pilot signal constitute a section in which there is no overlap with an unknown OFDM/OQAM multicarrier modulation signal in preceding and succeeding receivers. Therefore, in the ideal demodulation vectors of the pilot signals included in the continuous pilot signal, no interference occurs in the uncertain imaginary-axis direction due to the unknown OFDM/OQAM multicarrier modulation signal in the receiver, so that the ideal demodulation vector of the pilot signal is fixed to a single known point in the receiver. Therefore, in the first method of Patent Document 1, by calculating the amount of a change between a known ideal demodulation vector and a demodulation vector of an actually received pilot signal in the receiver, transmission channel characteristics are estimated.

FIG. 18 is a conceptual diagram illustrating a method for estimating transmission channel characteristics in the first method of Patent Document 1. In FIG. 18, an ideal demodulation vector (a point A) of a pilot signal and a demodulation vector (a point B) of an actually received pilot signal are illustrated on a complex plane. Since the ideal demodulation vector of the pilot signal is fixed to the single point A, the amount of a change between the ideal demodulation vector and the demodulation vector of the actually received pilot signal can be calculated.

Thus, by using a continuous pilot signal which is obtained by modulating all subcarriers over 2K−1 symbols with the same pilot signal, the ideal demodulation vector of a pilot signal is fixed to a single point, so that transmission channel characteristics can be estimated.

Next, a second method of Patent Document 1 will be described.

FIG. 19 is a diagram illustrating a portion of a frame format used in the second method. In FIG. 19, the horizontal axis represents an arrangement of subcarriers in the frequency direction, and the vertical axis represents an arrangement of symbols in the time direction. In the second method, a short continuous pilot signal is used which is obtained by modulating all subcarriers over one or more and less than 2K−1 symbols (three symbols in FIG. 19) with a pilot signal.

The short continuous pilot signal having a time corresponding to one or more and less than 2K−1 symbols overlaps an unknown OFDM/OQAM multicarrier modulation signal, which presents in preceding and succeeding of the short continuous pilot signal, in a receiver in any section. Therefore, the ideal demodulation vector of the pilot signal is invariably interfered with by an uncertain imaginary-axis component due to preceding and succeeding OFDM/OQAM multicarrier modulation signals. Therefore, the ideal demodulation vector of the pilot signal is not fixed to a single point, and therefore, is unknown to a receiver. Therefore, in the second method, by utilizing the fact that two adjacent subcarriers have substantially the same transmission channel characteristics, transmission channel characteristics are estimated based on the ideal demodulation vectors of pilot signals of two adjacent subcarriers at the same time.

FIG. 20 is a conceptual diagram illustrating a method for estimating transmission channel characteristics in the second method of Patent Document 1. In FIG. 20, a signal point which is obtained from a demodulation vector in an m-th subcarrier (any one subcarrier in FIG. 19) is represented by a point Rm, and a signal point which is obtained from a demodulation vector in an (m+1)-th subcarrier adjacent to the m-th subcarrier is represented by a point Rm+1. A straight line L0 in FIG. 20 represents a line connecting two signal points which are obtained from the ideal demodulation vectors of pilot signals obtained by demodulating pilot carriers of the m-th subcarrier and the (m+1)-th subcarrier when there is no variation or noise in a transmission channel. As illustrated in FIG. 20, a straight line extending through the point Rm and the point Rm+1 is indicated by L1, and an intersection point of a perpendicular line dropped from the origin O to the straight line L1 and the straight line L1 is indicated by P. By obtaining a distance between the intersection point P and the origin O and an angle θ between the I axis and the line segment OP to calculate the amounts of changes in amplitude and phase, transmission channel characteristics are estimated.

Also, since an interference component in the imaginary-axis direction occurring in a demodulation vector of a pilot signal depends on an unknown OFDM/OQAM multicarrier modulation signal in a receiver for an adjacent subcarrier, a distance between demodulation vectors of two pilot signals may be small. When the distance between demodulation vectors of two pilot signals is small, a demodulation error between the points Rm and Rm+1 has a significant influence on the slope of the straight line L1, so that, particularly, the precision of estimation of the amount of a change in phase is deteriorated. Therefore, in the second method, the numbers of repetitions of a pilot symbol is increased, thereby increasing the distance between demodulation vectors of two pilot signals. As the numbers of repetitions of a pilot symbol is increased, the influence of overlapping of an unknown OFDM/OQAM multicarrier modulation signal in a receiver becomes smaller. Thereby, as is similar to the spectrum of a pilot signal in the first method, the spectrum of a short continuous pilot signal of one or more and less than 2K−1 symbols is close to an emission line spectrum having a component at an intermediate frequency between two subcarrier modulation spectrum. Therefore, an interference from an OFDM/OQAM multicarrier modulation signal of an adjacent subcarrier is reduced. Therefore, the influence of the demodulation error between the point Rm and the point Rm+1 on the slope of the straight line L1 is reduced, resulting in an improvement in the precision of estimation of transmission channel characteristics.

Thus, a transmission channel can be estimated based on demodulation vectors of pilot signals of two adjacent subcarriers at the same time. Also, by increasing the numbers of repetitions of a pilot signal to increase the distance between demodulation vectors of two pilot signals, the precision of estimation of a transmission channel is improved.

Next, a third method of Patent Document 1 will be described.

In the third method, a short continuous pilot signal is used which is obtained by modulating all subcarriers over two or more and less than 2K−1 symbols with a pilot signal. In addition, by utilizing the fact that demodulation vectors of two successive pilot signals in the time direction in the same subcarrier suffer from substantially the same transmission channel distortion, transmission channel characteristics are estimated based on the demodulation vectors of two successive pilot signals in the time direction in the same subcarrier. In this case, although the number of repetitions of a pilot signal needs to be two or more, transmission channel characteristics can be estimated based on pilot signals of two successive symbols in the same subcarrier.

Thus, a transmission channel can be estimated based on demodulation vectors of pilot signals of two successive symbols in the same subcarrier.

Next, Patent Document 2 will be described.

In Patent Document 2, two adjacent subcarriers are successively modulated with the same pilot signal.

FIGS. 21A and 21B are conceptual diagrams illustrating pilot signals in Patent Document 2. FIG. 21A is a diagram illustrating a portion of a frame format. FIG. 21B is a schematic diagram illustrating a relationship in frequency between spectrum of pilot signals and subcarriers. In FIG.

21A, the horizontal axis represents an arrangement of subcarriers in the frequency direction, and the vertical axis represents an arrangement of symbols in the time direction. Thus, each pilot carrier includes two adjacent subcarriers, and the pilot carriers are successively modulated with the same known data. In FIG. 21B, the horizontal axis represents frequencies, and the vertical axis represents spectral intensities. Spectrum fp1 and fp2 of pilot signals appear as emission line spectrum each of which is located at a middle between two adjacent subcarrier modulation spectrum.

Since the spectrum fp1 and fp2 of the pilot signals have an intermediate frequency component between subcarriers, the spectrum fp1 and fp2 are not likely to suffer from an interference from adjacent data carriers Dc1 to Dc4. Therefore, the ideal demodulation vector of the pilot signal is fixed to substantially a single point, and is known to a receiver. Therefore, in Patent Document 2, as is similar to the transmission channel characteristics estimation method of FIG. 18 in the first method of Patent Document 1, the amount of a change between the ideal demodulation vector of the pilot signal which is known to a receiver and a demodulation vector of an actually received pilot signal is calculated to estimate transmission channel characteristics.

It is also described that, in order to improve the precision of estimation of transmission channel characteristics, an adjacent subcarrier of a pilot carrier is assigned as a mask carrier and is not used for data transmission. By using the mask carrier, an interference from a data transmission signal which occurs in the pilot signal is suppressed, the ideal demodulation vector of the pilot signal is more correctly fixed to a single point, and the precision of estimation of transmission channel characteristics is improved.

Thus, each pilot carrier including two subcarriers is assigned, and the pilot carriers are successively modulated with the same known data, or further, by assigning an adjacent subcarrier of a pilot carrier as a mask carrier, the ideal demodulation vector of the pilot signal can be fixed to substantially a single point, so that transmission channel characteristics can be estimated.

However, in the first method of Patent Document 1, it is necessary to repeatedly modulate all subcarriers over 2K−1 symbols with a pilot signal which is known both to a transmitter and a receiver in order to arrange a continuous pilot signal. Since the ideal demodulation vector of a pilot signal can be fixed to a single point, the precision of estimation of transmission channel characteristics is high. However, since a transmission data signal cannot be inserted during transmission of a continuous pilot signal, frequency efficiency is deteriorated. In particular, when the overlapping symbol number K is large, the frequency efficiency is further reduced.

Also, in the second method of Patent Document 1, it is necessary to modulate all subcarriers over one or more and less than 2K−1 symbols with the same pilot signal which is known data in a receiver in order to arrange a short continuous pilot signal. Also, when a time required to modulate all subcarriers with the same pilot signal is short, the distance between the ideal demodulation vectors of pilot signals of two adjacent subcarriers at the same time may be small, so that the precision of estimation of transmission channel characteristics is deteriorated. Meanwhile, there is a large variation in the estimated value of transmission channel characteristics calculated for each symbol, and there is also a large error. Therefore, as compared to the first method of Patent Document 1, the frequency efficiency is improved, but the precision of estimation of transmission channel characteristics is reduced and there is a large variation in the estimated value and there is also a large error. Also, in order to prevent the deterioration of the precision of estimation of transmission channel characteristics due to the small distance between the ideal demodulation vectors of two adjacent subcarriers, it is necessary to increase the number of repetitions of a pilot symbol, the frequency efficiency is reduced as is similar to the first method of Patent Document 1.

Also, in the third method of Patent Document 1, it is necessary to modulate all subcarriers over two or more and less than 2K−1 symbols with the same pilot signal which is known data in a receiver in order to arrange a short continuous pilot signal. Also, when a time required to modulate all subcarriers with the same pilot signal is short, the distance between the ideal demodulation vectors of pilot signals of two successive symbols in the time direction in the same subcarrier may be small. Therefore, the precision of estimation of transmission channel characteristics is deteriorated.

Further, in Patent Document 2, it is necessary to use pilot carriers each of which includes two adjacent subcarriers. When a limited frequency resource is effectively used or when the total number of subcarriers is small, it is preferable that the number of pilot carriers, which cannot be used for data transmission, be small. Also, when there is even a small interference component from an OFDM/OQAM multicarrier modulation signal of a subcarrier adjacent to a pilot carrier, it is difficult to fix the demodulation vector of the pilot signal completely to a single point, and therefore, the precision of estimation of transmission channel characteristics is deteriorated. To prevent this, it is necessary to assign a subcarrier adjacent to a pilot carrier as a mask carrier. In this case, however, the number of subcarriers which cannot be used for data transmission increases, the frequency efficiency is further reduced.

Note that it is also contemplated that the transmission channel estimation method in the second method of Patent Document 1 and the frame format of Patent Document 2 may be combined. Specifically, regarding the frame format, pilot carriers each of which includes two adjacent subcarriers are used as in FIG. 21A, and the same known data is inserted into the pilot carriers successively. Regarding the transmission channel estimation method, as in FIG. 20, transmission channel characteristics are estimated based on demodulation vectors of pilot signals of two adjacent subcarriers.

However, even when such a combination technique is used, the problem with Patent Document 2 that at least two adjacent subcarriers are required to generate a pilot carrier, and the problem with the second method of Patent Document 1 that the precision of estimation of transmission channel characteristics is reduced due to the small distance between demodulation vectors of pilot signals of two adjacent subcarriers, cannot be solved.

SUMMARY OF THE INVENTION

Therefore, an object of the present invention is to estimate the transmission channel characteristics using a pilot carrier with a high level of frequency efficiency and a high level of precision of estimation of transmission channel characteristics in the OFDM/OQAM multicarrier modulation scheme.

The present invention has the following features to attain the object mentioned above. A multicarrier modulation scheme of the present invention modulates a single subcarrier with a pilot signal in a transmitter to generate a pilot carrier, and transmits an OFDM/OQAM multicarrier modulation signal. Also, in a receiver, the OFDM/OQAM multicarrier modulation signal is demodulated, and based two successive demodulation vectors in a time direction which are obtained by demodulating the pilot carrier, transmission channel characteristics are estimated and corrected.

According to the present invention, the number of subcarriers used as pilot carriers is one, so that the frequency efficiency can be improved. In addition, since the distance between the ideal demodulation vectors of pilot signals of two successive symbols in the time direction can be maximized, the precision of estimation of transmission channel characteristics can be improved.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described with reference to the accompanying drawings.

First Embodiment

Figure 1:
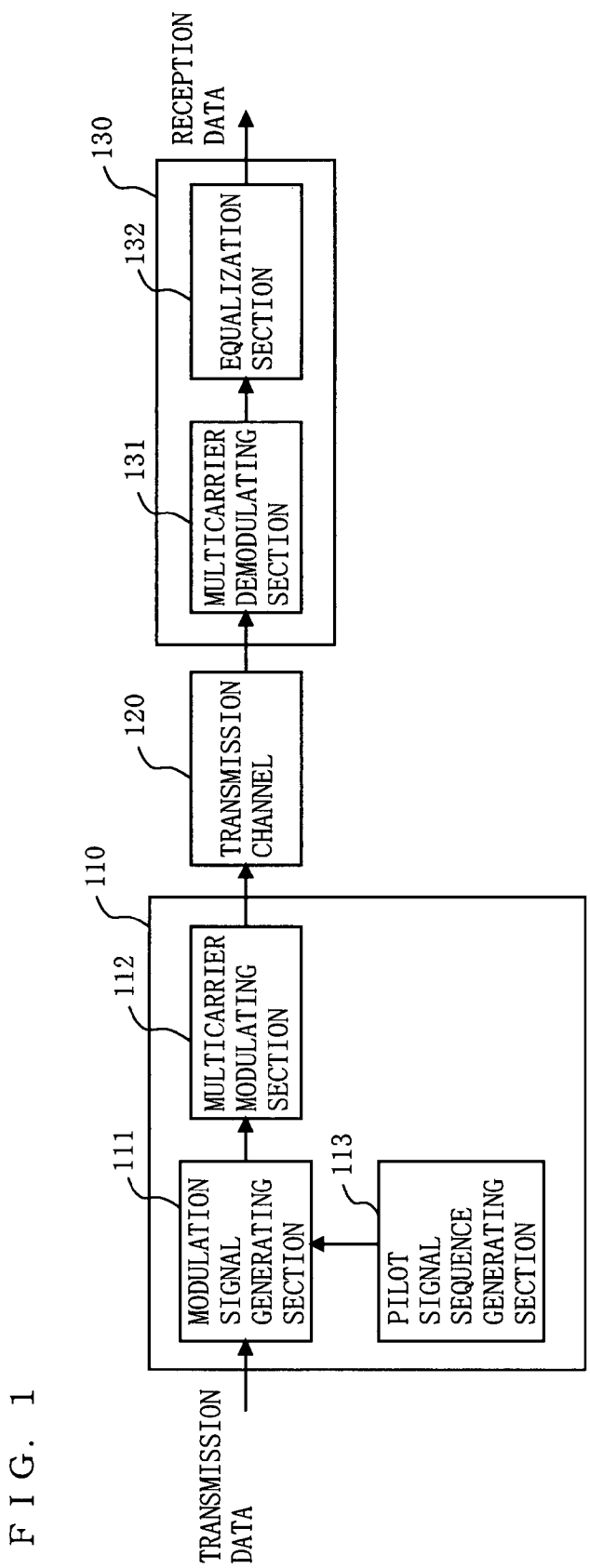
FIG. 1 is a diagram illustrating a configuration of a communication system employing multicarrier modulation according to a first embodiment of the present invention.

FIG. 1 is a diagram illustrating a configuration of a communication system employing multicarrier modulation according to a first embodiment of the present invention. In the communication system of FIG. 1, a transmitter 110 and a receiver 130 are connected to each other via a transmission channel 120. A multicarrier signal emitted by the transmitter 110 is received by the receiver 130 via the transmission channel 120. The transmission channel 120 is a wired channel or a wireless channel. When the transmission channel 120 is a wireless channel, transmission from the transmitter 110 to the transmission channel 120 and from the transmission channel 120 to the receiver 130 is performed via an antenna (not shown).

The transmitter 110 includes a pilot signal sequence generating section 113, a modulation signal generating section 111, and a multicarrier modulating section 112. The pilot signal sequence generating section 113 generates a cyclic pilot signal sequence using a reference pilot signal sequence described below. The modulation signal generating section 111 performs amplitude modulation based on input transmission data to generate a transmission data signal sequence (baseband signal), and inserts the cyclic pilot signal output by the pilot signal sequence generating section 113 into the transmission data signal sequence to generate a modulation signal. The multicarrier modulating section 112 receives and subjects the modulation signal generated by the modulation signal generating section 111 to OFDM/OQAM multicarrier modulation to generate an OFDM/OQAM multicarrier modulation signal. The OFDM/OQAM multicarrier modulation signal is transmitted via the transmission channel 120 to the receiver 130.

The receiver 130 includes a multicarrier demodulating section 131 and an equalization section 132. The multicarrier demodulating section 131 subjects the received OFDM/OQAM multicarrier modulation signal to OFDM/OQAM multicarrier demodulation to generate a demodulation vector. The equalization section 132 receives the demodulation vector generated by the multicarrier demodulating section 131, and based on demodulation vectors of two successive pilot signals in a time direction, estimates and compensates for transfer characteristics of the transmission channel 120.

Figure 2:
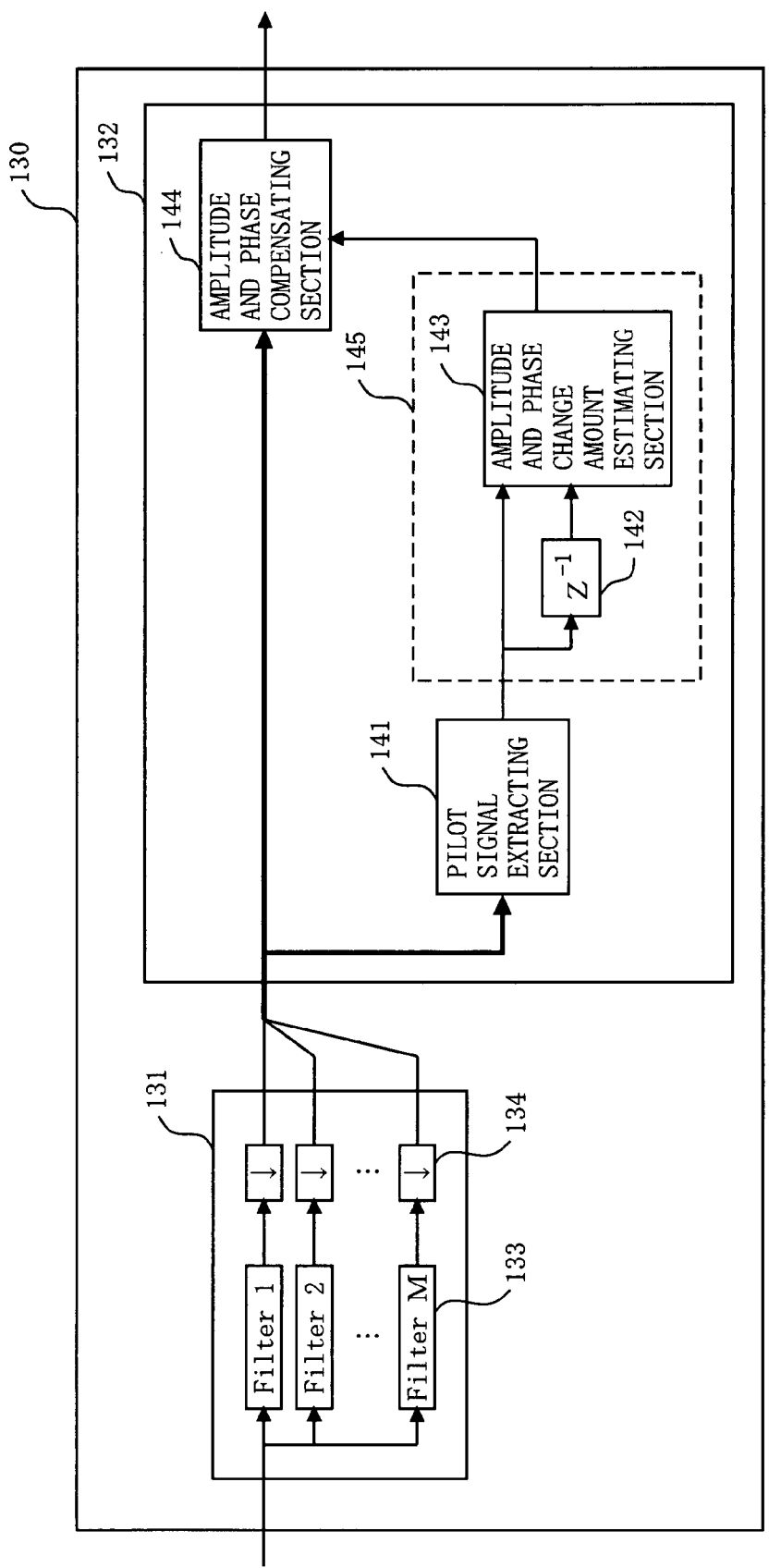
FIG. 2 is a diagram illustrating a detailed configuration of a receiver 130 of FIG. 1.

FIG. 2 is a diagram illustrating a detailed configuration of the receiver 130.

The multicarrier demodulating section 131 includes demodulation filters 133 provided for respective subcarriers (indicated by Filter 1 to Filter M in FIG. 2) and down samplers 134 (indicated by ↓ in FIG. 2). The demodulation filter 133 receives the OFDM/OQAM multicarrier modulation signal and outputs a demodulation signal per sample. The down sampler 134 receives the demodulation signals output by the demodulation filter 133, extracts only a demodulation signal (s) at symbol timing, and outputs the extracted signal as a demodulation vector.

The equalization section 132 includes a pilot signal extracting section 141, a transmission channel characteristics estimating section 145, and an amplitude and phase compensating section 144. The transmission channel characteristics estimating section 145 includes a delay section 142 (indicated by $Z^{-1}$ in FIG. 2) and an amplitude and phase change amount estimating section 143. The pilot signal extracting section 141 receives demodulation vectors output by the multicarrier demodulating section 131, extracts only a demodulation vector(s) which is obtained by demodulating a pilot signal, and outputs the extracted signal as a pilot signal demodulation vector. The transmission channel characteristics estimating section 145 receives the pilot signal demodulation vector output by the pilot signal extracting section 141, and estimates the amounts of changes in amplitude and phase which represent transfer characteristics of the transmission channel 120. The delay section 142 receives the pilot signal demodulation vector output by the pilot signal extracting section 141, and outputs a delayed pilot signal demodulation vector which is delayed by a one-symbol time interval, i.e., Ts. The amplitude and phase change amount estimating section 143 estimates the amplitude and phase change amounts indicating the transfer characteristics of the transmission channel 120 based on the pilot signal demodulation vector output by the pilot signal extracting section 141 and the delayed pilot signal demodulation vector output by the delay section 142. The amplitude and phase compensating section 144 compensates for an amplitude and a phase of the demodulation vector output by the multicarrier demodulating section 131 based on the amplitude and phase change amounts estimated by the amplitude and phase change amount estimating section 143, and outputs the result as reception data from the equalization section 132.

Here, behaviors of a demodulation signal and a demodulation vector of an OFDM/OQAM multicarrier modulation signal will be initially described before describing the cyclic pilot signal in the first embodiment.

Figure 3:
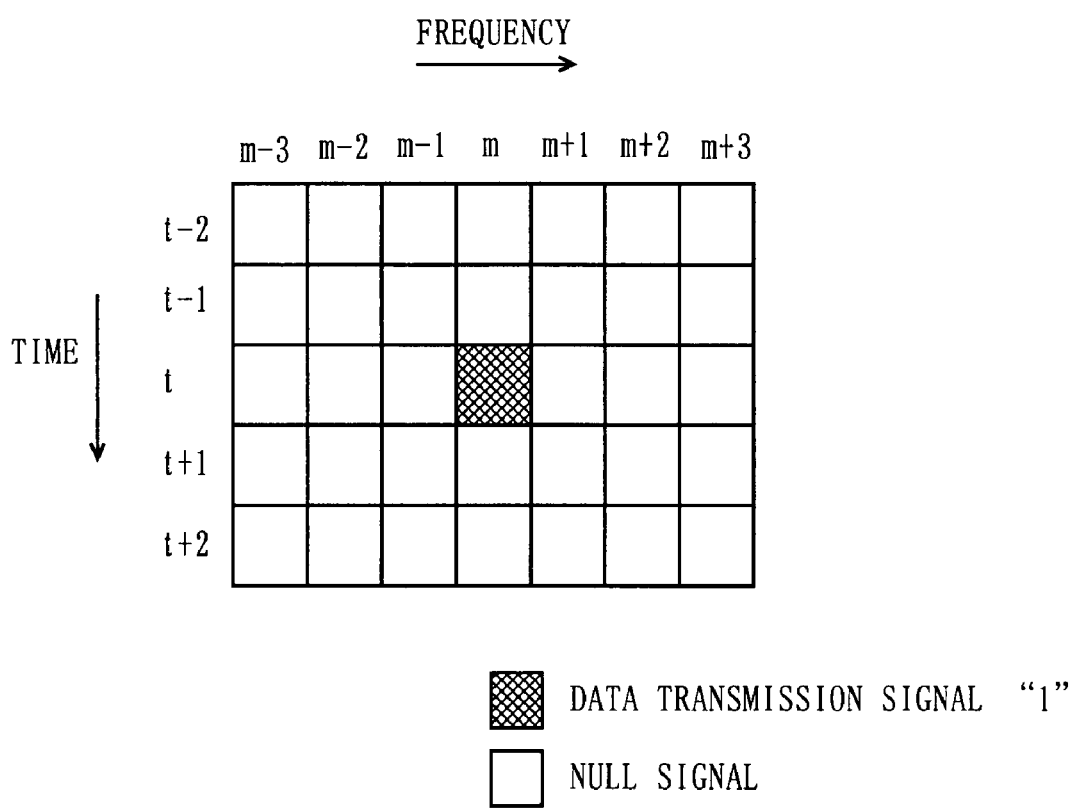
FIG. 3 is a diagram illustrating an exemplary modulation signal used in the first embodiment.

Now, it will be discussed what time responses of a demodulation signal output by the demodulation filter 133 and a demodulation vector output by the multicarrier demodulating section 131 are obtained when a modulation signal of FIG. 3 is generated by the modulation signal generating section 111.

In FIG. 3, the vertical axis represents an arrangement of symbols in the time direction, and the horizontal axis represents an arrangement of subcarriers in the frequency direction. A data transmission signal "1" is inserted only in a t-th symbol and an m-th subcarrier. Note that the OFDM/OQAM overlapping symbol number K is assumed as "2" in the following description.

Figure 4B:
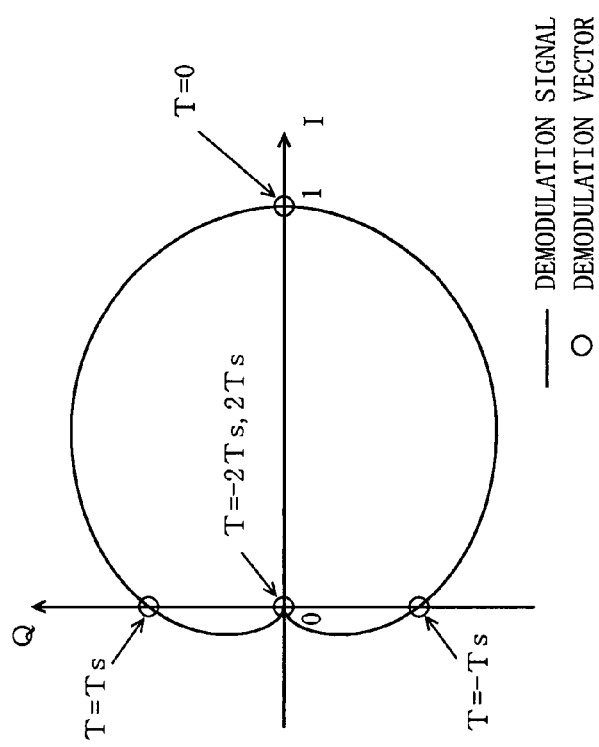
FIG. 4B is a diagram illustrating trajectories of a demodulation signal and a demodulation vector corresponding to FIG. 4A.
Figure 4A:
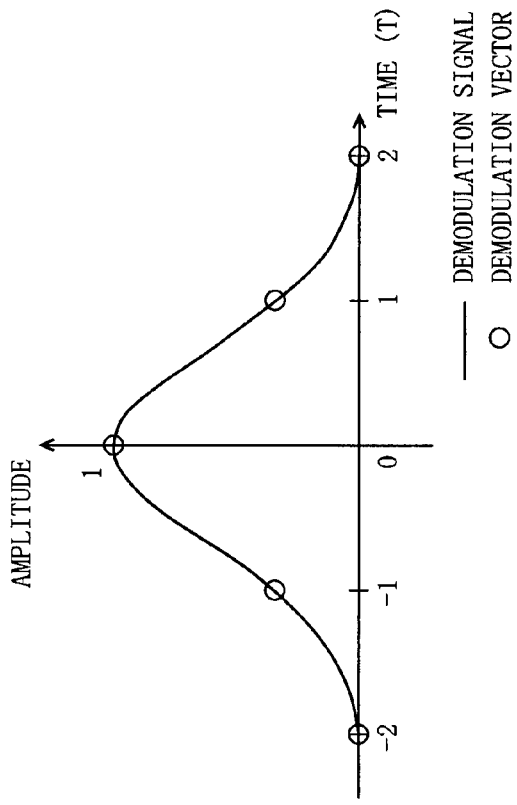
FIG. 4A is a complex plane diagram illustrating exemplary time responses of a demodulation signal and a demodulation vector of an m-th subcarrier.

FIGS. 4A and 4B illustrate, as an example, a demodulation signal of the data transmission signal "1" which corresponds to the m-th subcarrier and is output from the demodulation filter 133, and a demodulation vector of the data transmission signal "1" which corresponds to the m-th subcarrier and is output from the down sampler 134. FIG. 4A is a diagram illustrating time responses of the demodulation signal and the demodulation vector. FIG. 4B is a diagram illustrating trajectories on a complex plane of the demodulation signal and the demodulation vector. In FIG. 4A, the horizontal axis represents times and the vertical axis represents amplitudes. As can be seen from FIG. 4A, the time response of the demodulation signal of the data transmission signal "1" in the m-th subcarrier has a waveform which has a maximum amplitude at time T=0. Here, time T is defined where the symbol timing of the t-th symbol is used as a reference (T=0). Since the symbol sampling length of a multicarrier signal is KM and the number of taps of the demodulation filter 133 is KM, the time response of the demodulation signal has a length of 2KM-1. In FIG. 4B, the trajectory of the demodulation signal of the m-th subcarrier starts from the origin at T=−2Ts, has a maximum amplitude on the real axis at T=0, and returns to the origin at T=2Ts, (counter-clockwise rotation). The trajectory of the demodulation vector of the data transmission signal "1" in the m-th subcarrier has a real-axis component only at T=0, and only imaginary-axis components or an amplitude of zero at all the other symbol timings, and rotates anti-clockwise at intervals of π/2 per symbol timing.

Thus, although, in OFDM/OQAM, the time response of a demodulation signal of one symbol overlaps a plurality of symbols to interfere with its preceding and succeeding symbols, all the interferences occur as imaginary-axis components at timings of the preceding and succeeding symbols. Therefore, the occurring interference components in the time-axis direction do not have an influence on the real-axis components of demodulation symbols of OFDM/OQAM modulation signals of the preceding and succeeding symbols.

Figure 5B:
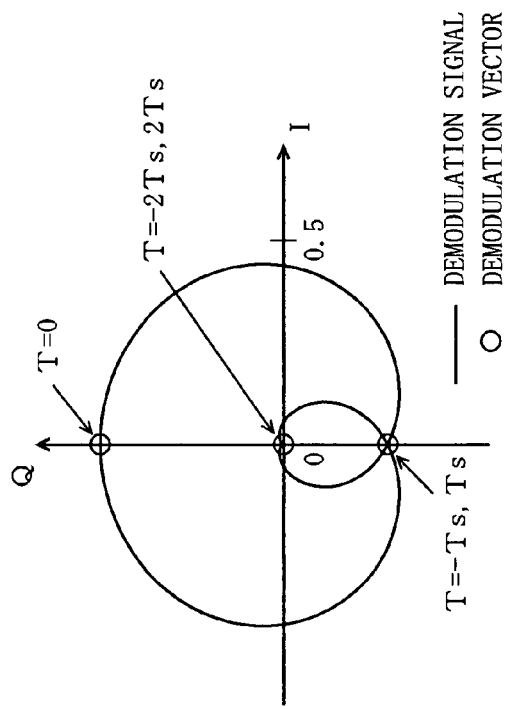
FIG. 5B is a diagram illustrating trajectories of a demodulation signal and a demodulation vector corresponding to FIG. 5A.
Figure 5A:
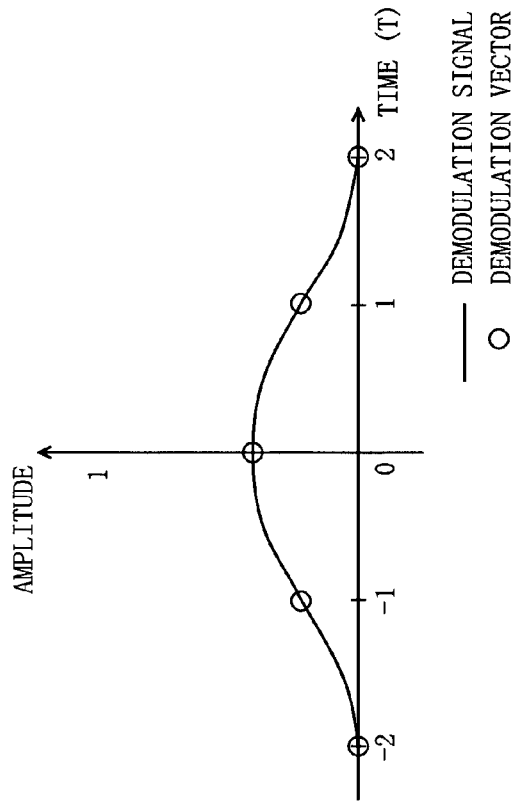
FIG. 5A is a complex plane diagram illustrating exemplary time responses of a demodulation signal and a demodulation vector of an (m+1)-th subcarrier.

FIGS. 5A and 5B illustrate, as an example, a demodulation signal of the data transmission signal "1" which corresponds to an (m+1)-th subcarrier and is output from the demodulation filter 133, and a demodulation vector of the data transmission signal "1" which corresponds to the (m+1)-th subcarrier and is output from the down sampler 134. FIG. 5A is a diagram illustrating time responses of the demodulation signal and the demodulation vector. FIG. 5B is a diagram illustrating trajectories of the demodulation signal and the demodulation vector on a complex plane. In FIG. 5A, the horizontal axis represents times and the vertical axis represents amplitudes. As can be seen from FIG. 5A, the time response of the demodulation signal of the (m+1)-th subcarrier has a waveform which has a maximum amplitude at time T=0, and the maximum amplitude is smaller than that of FIG. 4A. This indicates that an interference component of the data transmission signal inserted in the m-th subcarrier occurs in the adjacent (m+1)-th subcarrier. In FIG. 5B, the trajectory of the demodulation signal of the (m+1)-th subcarrier starts from the origin at T=−2Ts and returns to the origin at T=2Ts, i.e., rotates counter-clockwise. The trajectory of the demodulation vector has only imaginary-axis components at all symbol timings.

Thus, in OFDM/OQAM, a data transmission signal inserted in a subcarrier interferes with an adjacent subcarrier, and the interference components all occur in imaginary-axis components. Therefore, the occurring interference components in the frequency direction do not have an influence on the real-axis component of the demodulation symbol of the OFDM/OQAM modulation signal of an adjacent subcarrier.

Next, the cyclic pilot signal of the first embodiment will be described.

Figure 6:
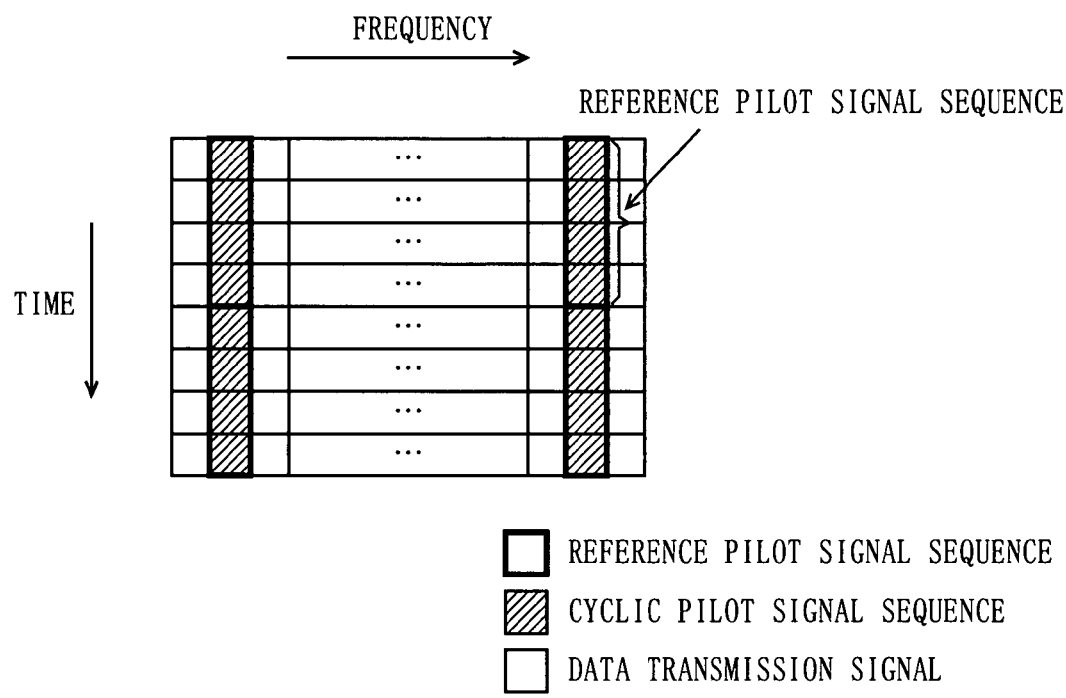
FIG. 6 is a diagram illustrating a portion of a frame format in the multicarrier modulation scheme of the first embodiment of the present invention.

FIG. 6 is a diagram illustrating a portion of a frame format in the multicarrier modulation scheme of the first embodiment of the present invention. In FIG. 6, the horizontal axis represents an arrangement of subcarriers in the frequency direction, and the vertical axis represents an arrangement of symbols in the time direction. Thus, in the multicarrier modulation scheme of the first embodiment, a single subcarrier is modulated with a pilot signal to generate a pilot carrier.

The pilot signal is obtained by cycling a reference pilot signal sequence which has a cycle of four and is composed of $\{\alpha, \alpha, -\alpha, -\alpha\}$ (note that $\alpha$ is a real number of 0 or more) X times (X is a real number of 1 or more which becomes a natural number when it is multiplied by 4). The pilot signal is hereinafter referred to as a cyclic pilot signal sequence. For example, when X=2, the cyclic pilot signal sequence takes any value of $\{\alpha, \alpha, -\alpha, -\alpha, \alpha, \alpha, -\alpha, -\alpha\}$, $\{\alpha, -\alpha, -\alpha, \alpha, \alpha, -\alpha, -\alpha, \alpha\}$, $\{-\alpha, -\alpha, \alpha, \alpha, -\alpha, -\alpha, \alpha, \alpha\}$, and $\{-\alpha, \alpha, \alpha, -\alpha, -\alpha, \alpha, \alpha, -\alpha\}$. For example, X=1.5, the cyclic pilot signal sequence takes any value of $\{\alpha, \alpha, -\alpha, -\alpha, \alpha, \alpha\}$, $\{\alpha, -\alpha, -\alpha, \alpha, \alpha, -\alpha\}$, $\{-\alpha, -\alpha, \alpha, \alpha, -\alpha, -\alpha\}$, and $\{-\alpha, \alpha, \alpha, -\alpha, -\alpha, \alpha\}$.

Hereinafter, it is assumed that the reference pilot signal sequence is "+1, +1, −1, −1", and the OFDM/OQAM overlapping symbol number K is "2".

Figure 7:
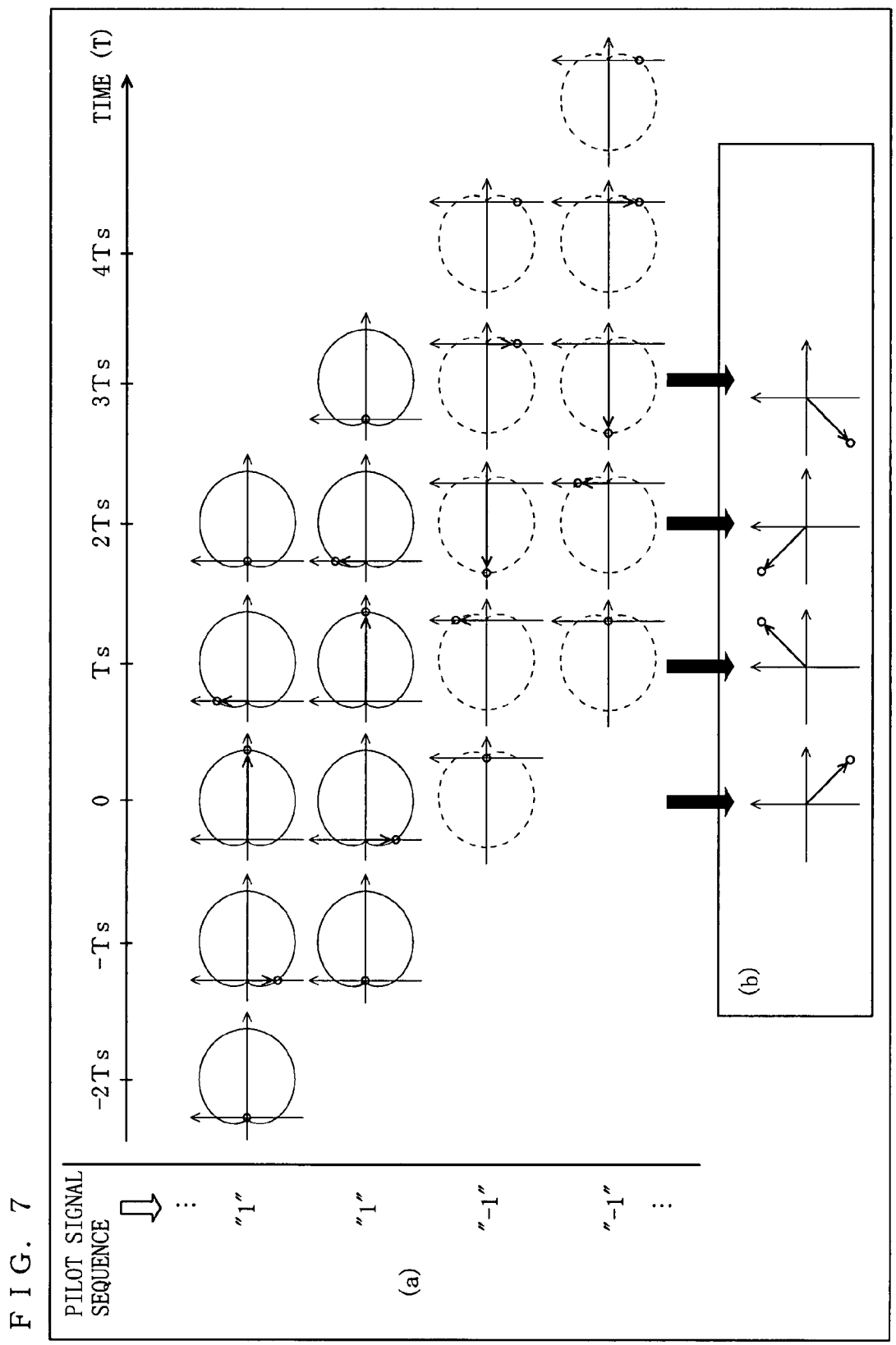
FIG. 7 is a schematic diagram illustrating exemplary demodulation vectors of pilot signals.

FIG. 7 is a schematic diagram illustrating demodulation vectors of pilot signals when the overlapping symbol number K=2. A portion (a) of FIG. 7 is a diagram illustrating a demodulation vector on a complex plane of a pilot signal inserted in each symbol for each symbol timing, in a subcarrier used as a pilot carrier. A portion (b) of FIG. 7 is a diagram illustrating the resultant vector on a complex plane of demodulation vectors of pilot signals observed at symbol timings.

In the portion (a) of FIG. 7, the vertical axis represents pilot signals inserted in pilot carriers, and the horizontal axis represents times of symbol timings. Here, regarding time T, the symbol timing of a symbol in which the first pilot signal "+1" of the reference pilot signal sequence "+1, +1, −1, −1" is inserted is used as a reference (T=0). As can be seen from FIG. 7, the trajectory of a demodulation vector of a pilot signal inserted in each symbol starts from the origin, rotates counter-clockwise, and returns to the origin, as in FIG. 4B. In the portion (b) of FIG. 7, the resultant vector of demodulation vectors of pilot signals observed at symbol timings has a value obtained by adding demodulation vectors at the same symbol timing of the separate time responses of the symbols in the portion (a) of FIG. 7. Ideal demodulation vectors of the cyclic pilot signal sequence repeatedly appear, on the complex plane, (1, −1)→(1, 1)→(−1, 1)→>(−1, −1). Taking it into consideration that the time response of the cyclic pilot signal sequence of each symbol has the trajectory of FIG. 4B, it will be understood that a distance between demodulation vectors of pilot signals in two successive symbols is maximized.

Figure 8:
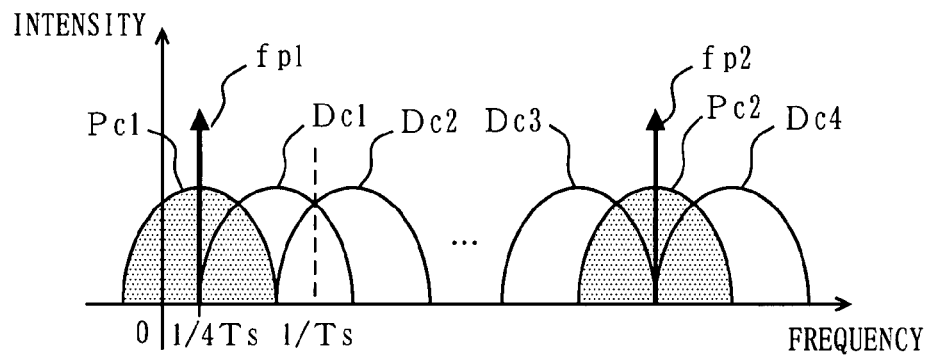
FIG. 8 is a schematic diagram illustrating a relationship in frequency between spectrum of pilot signals and subcarriers of the first embodiment of the present invention.

FIG. 8 is a schematic diagram illustrating a relationship in frequency between spectrum of pilot signals and subcarriers. In FIG. 8, a spectrum fp1 of a pilot signal appears a center frequency of a subcarrier Pc1, and a spectrum fp2 of a pilot signal appears a center frequency of a subcarrier Pc2. Since the cyclic pilot signal sequence is composed of repetitions of the reference pilot signal sequence with a cycle of four (the time-axis cycle is 4Ts), the spectrum appears at a frequency of 1/(4Ts). On the other hand, OFDM/OQAM subcarriers have a frequency interval of 1/(2Ts) and are each provided at a location shifted by 1/(4Ts) from the center frequency of a corresponding subcarrier. Therefore, the spectrum of the cyclic pilot signal sequence coincide with the center frequencies of the OFDM/OQAM subcarriers.

Figure 9:
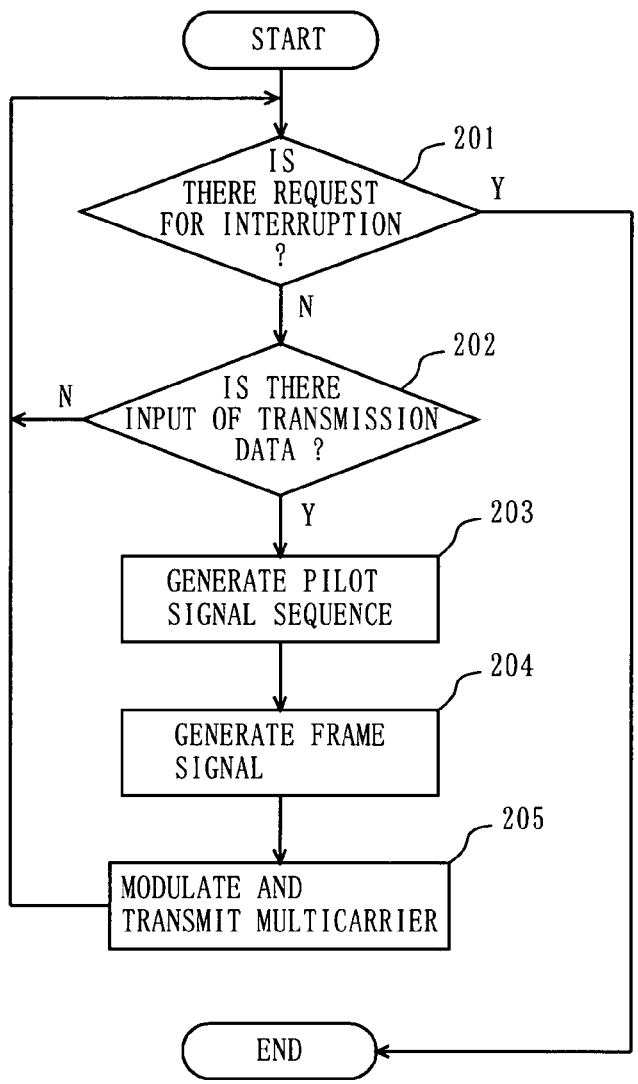
FIG. 9 is a flowchart illustrating an operation of a transmitter which employs the multicarrier transmission method of the first embodiment of the present invention.

FIG. 9 is a flowchart illustrating an operation of a transmitter which employs the multicarrier transmission method of the first embodiment of the present invention.

Initially, it is determined whether or not there is a request for interruption of the transmitter (step S201). If there is no request for interruption of the transmitter, then it is determined whether or not there is an input of transmission data (step S202). Here, if there is an input of transmission data, a cyclic pilot signal sequence including a reference pilot signal sequence represented by any of amplitude modulation vectors $\{\alpha, \alpha, -\alpha, -\alpha\}$, $\{\alpha, -\alpha, -\alpha, \alpha\}$, $\{-\alpha, -\alpha, \alpha, -\alpha\}$, and $\{-\alpha, -\alpha, \alpha, \alpha\}$ using the real number $\alpha$ excluding 0 is generated (step S203). Thereafter, the generated cyclic pilot signal sequence is inserted into a transmission data signal sequence to generate a frame signal (step S204). Finally, the generated frame signal is subjected to multicarrier modulation and the result is transmitted (step S205). The processes of steps S202 to S205 are repeatedly performed until there is a request for interruption of the transmitter.

Figure 10:
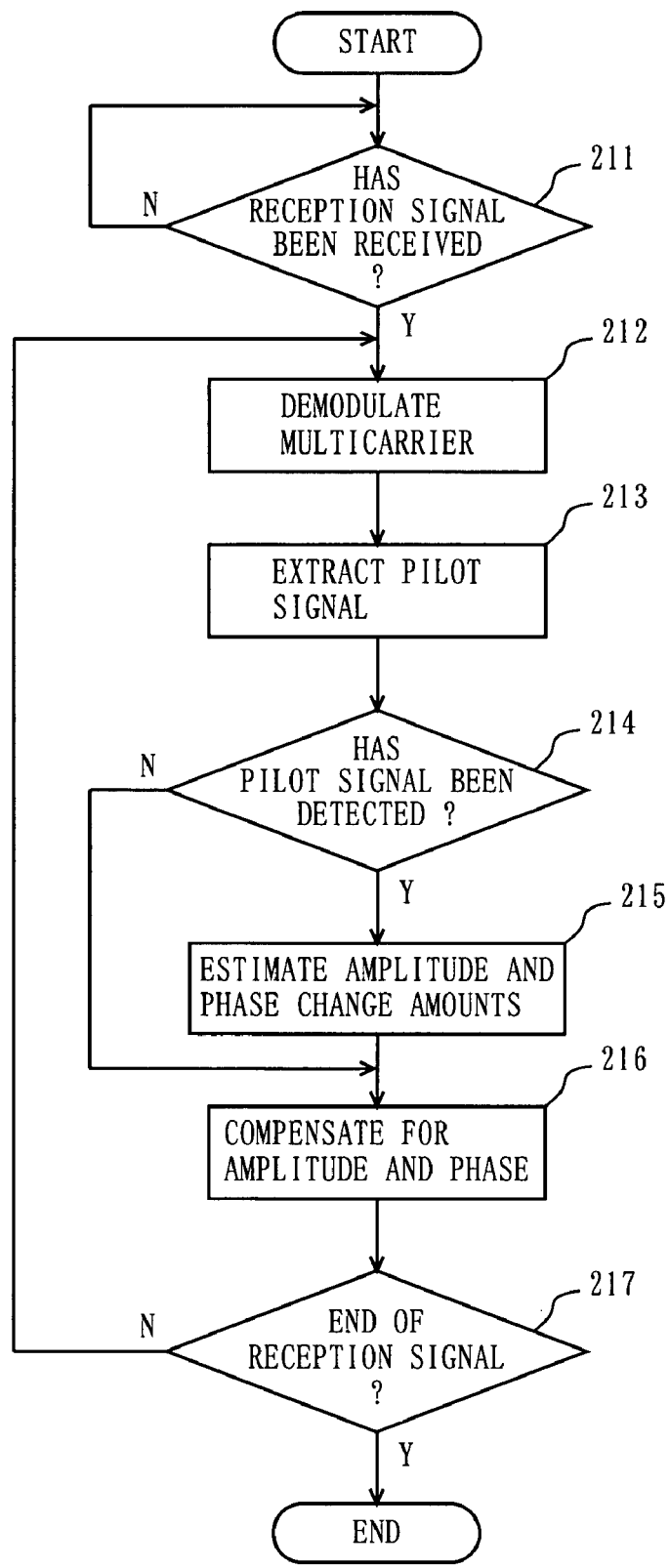
FIG. 10 is a flowchart illustrating an operation of a receiver which employs the multicarrier transmission method of the first embodiment of the present invention.

FIG. 10 is a flowchart illustrating an operation of a receiver which employs the multicarrier transmission method of the first embodiment of the present invention.

Initially, it is determined whether or not a multicarrier modulation signal transmitted by a transmitter has been detected (step S211). If a multicarrier modulation signal has been detected, then the multicarrier modulation signal is demodulated to generate a demodulation vector (step S212). Next, a demodulation vector corresponding to a pilot carrier is extracted as a pilot signal demodulation vector from the generated demodulation vectors (step S213) Thereafter, it is determined whether or not a pilot signal demodulation vector has been extracted (step S214). If a pilot signal demodulation vector has been extracted, amplitude and phase change amounts indicating transmission channel characteristics are estimated from the pilot signal demodulation vector (step S215), and based on the estimated amplitude and phase change amounts, the amplitude and phase of the demodulation vector are compensated for (step S216). On the other hand, if a pilot signal demodulation vector has not been extracted, the amplitude and phase of the demodulation vector are compensated for without estimation of amplitude and phase change amounts (step S216).

Thus, in OFDM/OQAM, by using a cyclic pilot signal sequence obtained by cycling a reference pilot signal sequence, not only the spectrum are caused to be emission line spectrum having frequencies equal to center frequencies of subcarriers, but also the distance between demodulation vectors of pilot signals of two successive symbols in the time direction can be maximized.

Further, since the spectrum of the cyclic pilot signal sequence have the center frequencies of the OFDM/OQAM subcarriers, the spectrum of a pilot carrier has a frequency which is most distant from the center frequency of the adjacent subcarrier, and therefore, the pilot carrier is unlikely to suffer from an interference component of an OFDM/OQAM modulation signal of its adjacent subcarrier. Therefore, as in the frame format of FIG. 6, even if a data transmission signal of a subcarrier adjacent to a pilot carrier is present, it is possible to suppress an imaginary-axis direction interference component from occurring in a demodulation vector of a pilot signal.

Figure 11:
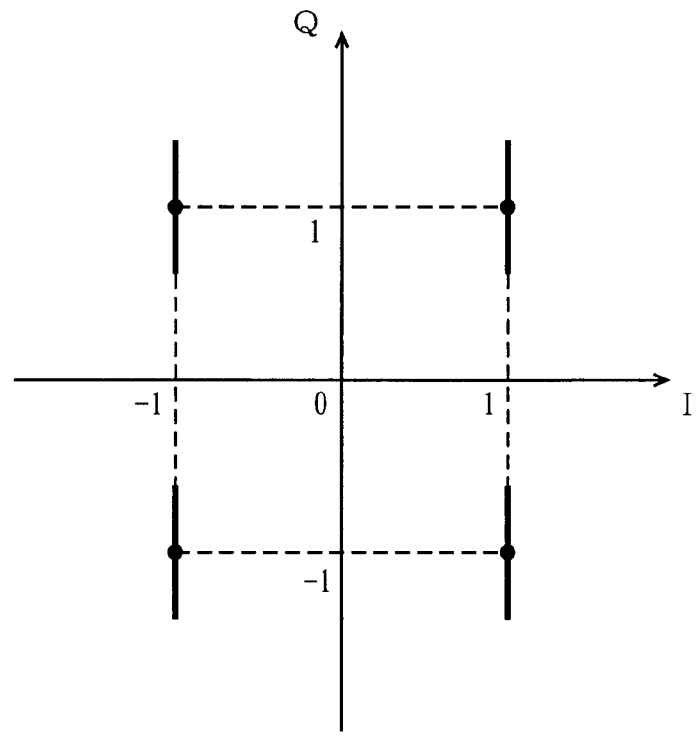
FIG. 11 is a complex plane diagram illustrating a range within which an ideal demodulation vector of a pilot signal is present in the first embodiment of the present invention.

FIG. 11 is a diagram illustrating a range on a complex plane within which an ideal demodulation vector of a pilot signal is present in the first embodiment of the present invention. In FIG. 11, although the range within which an ideal demodulation vector of a pilot signal is present, an interference component from a data carrier adjacent to a pilot carrier is present in the imaginary-axis direction, but the interference component is small and appears around the ideal demodulation vector, so that the distance between demodulation vectors of pilot signals of symbols can be held at the maximum level.

Next, a method for estimating amplitude and phase change amounts according to the first embodiment of the present invention will be specifically described.

Figure 12:
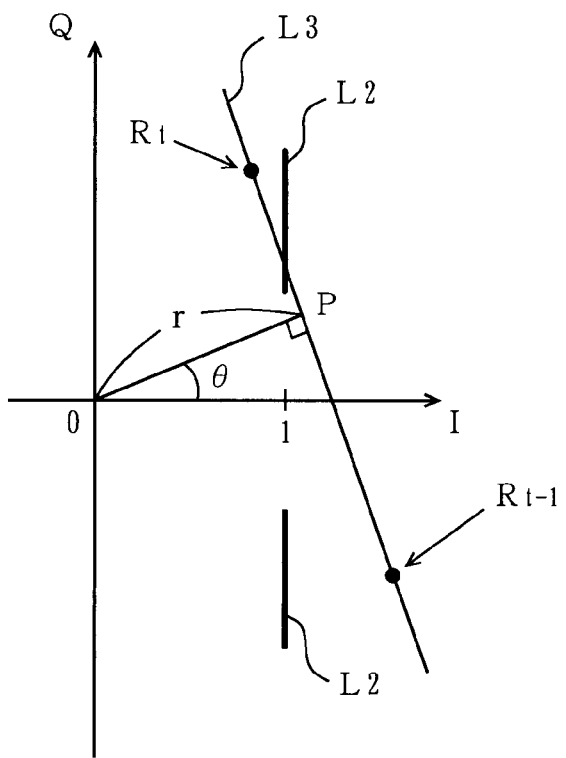
FIG. 12 is a schematic diagram illustrating a transmission channel estimation method according to the first embodiment of the present invention.

FIG. 12 is a schematic diagram illustrating the transmission channel estimation method of the first embodiment of the present invention. In FIG. 12, a signal point obtained from a demodulation vector of a (t−1)-th symbol in a pilot carrier fp1 is assumed to be a point Rt−1, and a signal point obtained from a demodulation vector of a t-th symbol in the pilot carrier fp1 is assumed to be a point Rt. A straight line L2 indicates a range within which the demodulation vectors of the (t−1)-th and t-th pilot signals are present when there is no variation or noise of a transmission channel. As in FIG. 12, a straight line L3 is drawn through the point Rt−1 and the point Rt, and an intersection point of a perpendicular line dropped from the origin O to the straight line L3 and the straight line L3 is indicated by P. A distance r between the point P and the origin O and an angle θ between the I axis and the line segment OP are obtained, thereby making it possible to detect a phase difference and an amplitude difference, and estimate and correct transmission channel characteristics, errors in frequency and phase between a transmitter and a receiver, or the like.

Also, as described above, since the cyclic pilot signal sequence is used, the distance between demodulation vectors of pilot signals of two successive symbols is invariably large. Therefore, it is possible to reduce an influence of a demodulation error of a pilot signal on the slope of the straight line L3, resulting in an improvement in the precision of estimation of transmission channel characteristics. Further, since the distance between demodulation vectors of pilot signals is invariably large, a variation in estimated value of transmission channel characteristics calculated for each symbol is small, and an error can be reduced.

As described above, according to the multicarrier modulation according to the first embodiment of the present invention, a single subcarrier is modulated with a pilot signal in a transmitter to generate a pilot carrier, so that transmission channel characteristics, errors in frequency and phase between the transmitter and a receiver, and the like can be estimated and corrected. Thereby, the number of subcarriers required as pilot carriers is one, so that a communication system having a high level of frequency efficiency can be achieved.

Also, a real number α which is more than 0 and is known to a receiver is used, and a cyclic pilot signal sequence obtained by cycling a reference pilot signal sequence composed of any of amplitude modulation vectors {α, α, −α, −α}, {α, −α, −α, α}, {−α, α, α, −α}, and {−α, −α, α, α} once or more is used. Therefore, not only the spectrum are caused to be emission line spectrum having frequencies equal to center frequencies of subcarriers, but also it is possible to reduce an error occurring when the slope of a straight line connecting between demodulation vectors of pilot signals of two successive symbols is obtained, resulting in an improvement in the precision of estimation of transmission channel characteristics.

Although it has been described in the first embodiment that the OFDM/OQAM overlapping symbol number K is two, the same cyclic pilot signal sequence can be applied to a case where the overlapping symbol number K is more than two. This is because, even when the overlapping symbol number K is more than two, phases to be modulated between symbols adjacent to each other are caused to be different by π/2 radians, and due to this feature of OFDM/OQAM, ideal demodulation vectors of pilot signals become similar, and in addition, even when K>2, the amount of an interference of an imaginary-axis component generated from a symbol more distant than preceding and succeeding symbols is small.

Also, the reference pilot signal sequence used in the first embodiment may be "−1, +1, +1, −1", "−1, −1, +1, +1", or "+1, −1, −1, +1" as well as "+1, +1, −1, −1". In other words, when a cyclic pilot signal sequence is generated, the cyclic sequence may have positive, positive, negative and negative signs in this order.

Further, although the first embodiment has been described using ELT which is a type of lapped orthogonal transform as OFDM/OQAM, phases to be modulated between symbols adjacent to each other or subcarriers adjacent to each other may be caused to be different by π/2 radians, and the time interval Ts of the symbol and the frequency interval fs of the carrier may have a relationship Ts=1/(2fs). Therefore, for example, in addition to ELT, LOT (Lapped Orthogonal Transform), MLT (Modulated Lapped Transform), or GenLOT (Generalized Lapped Orthogonal Transform) may be used.

Second Embodiment

Figure 13:
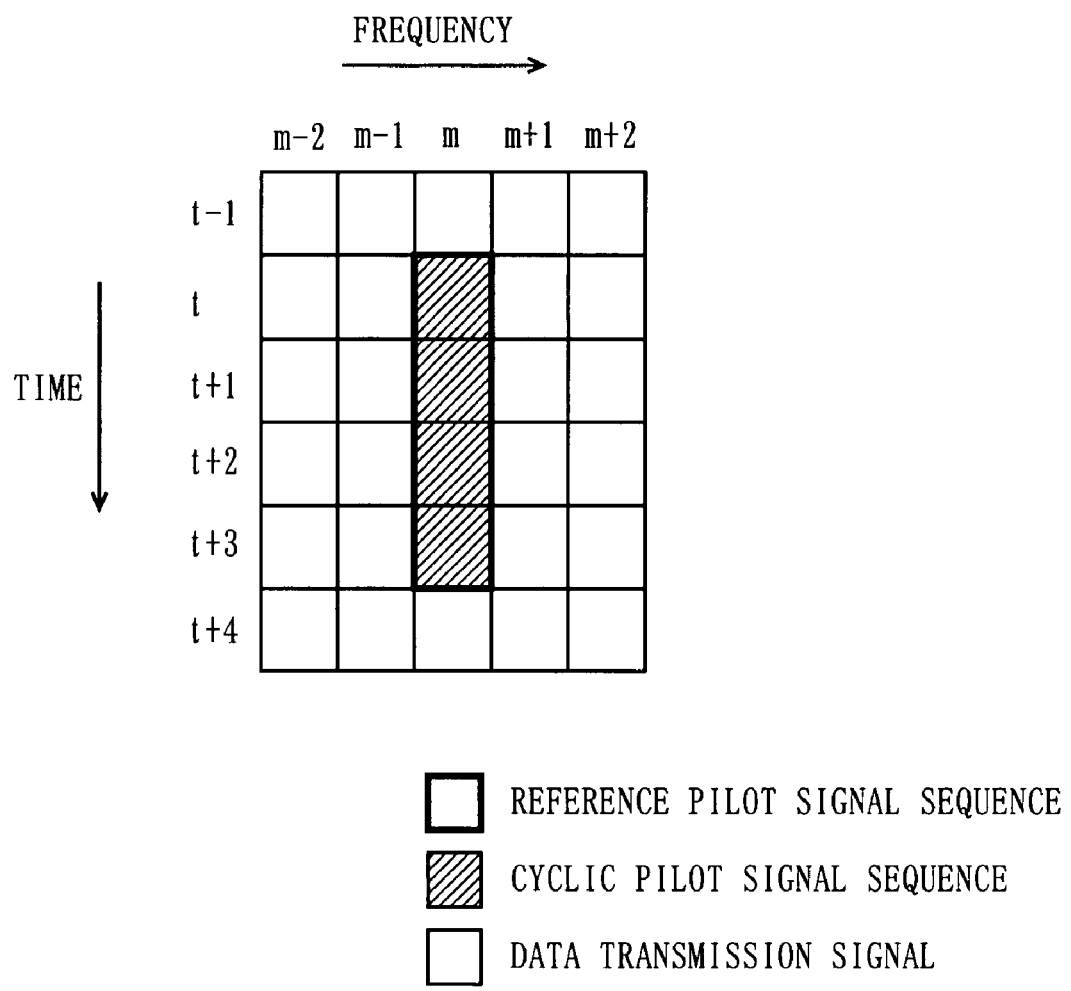
FIG. 13 is a diagram illustrating a portion of a frame format in a multicarrier modulation scheme according to a second embodiment of the present invention.
Figure 14:
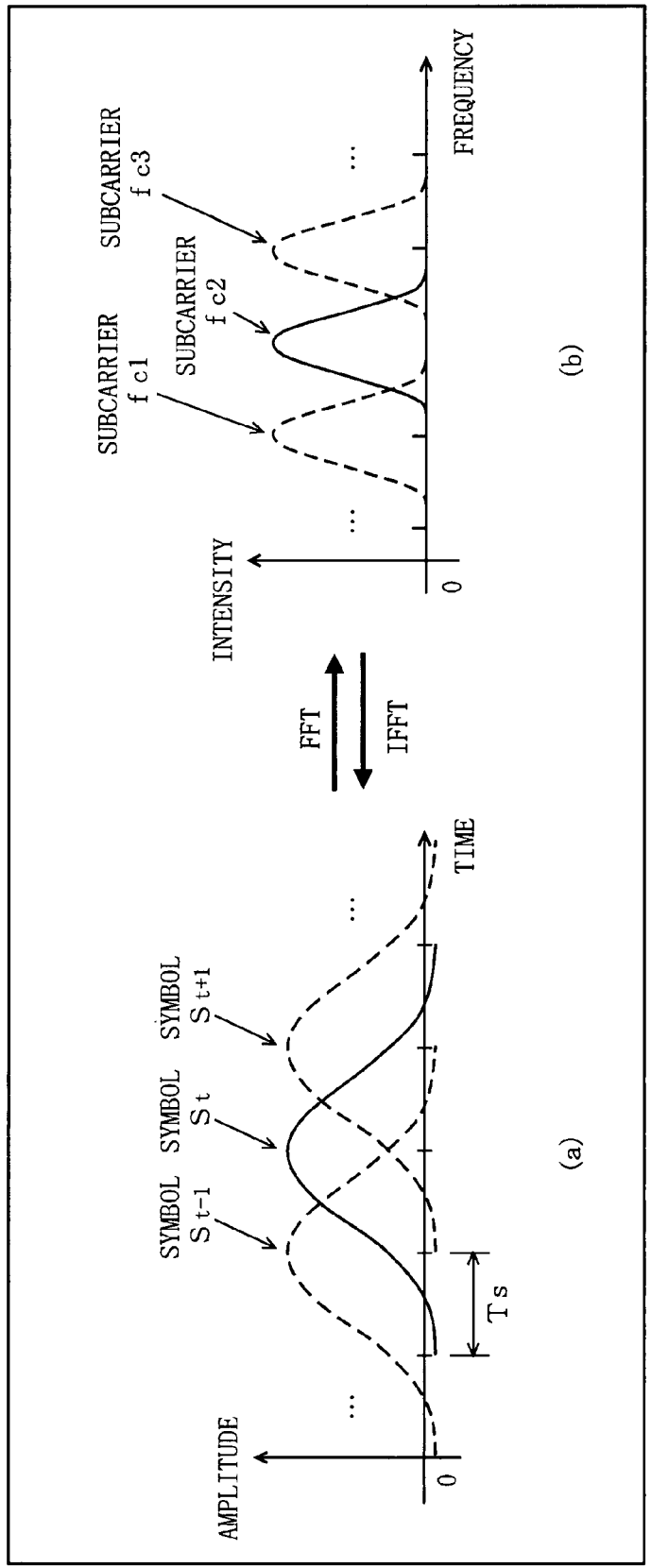
FIG. 14 is a diagram illustrating exemplary time and frequency responses of OFDM/OQAM multicarrier modulation signals.
Figure 15B:
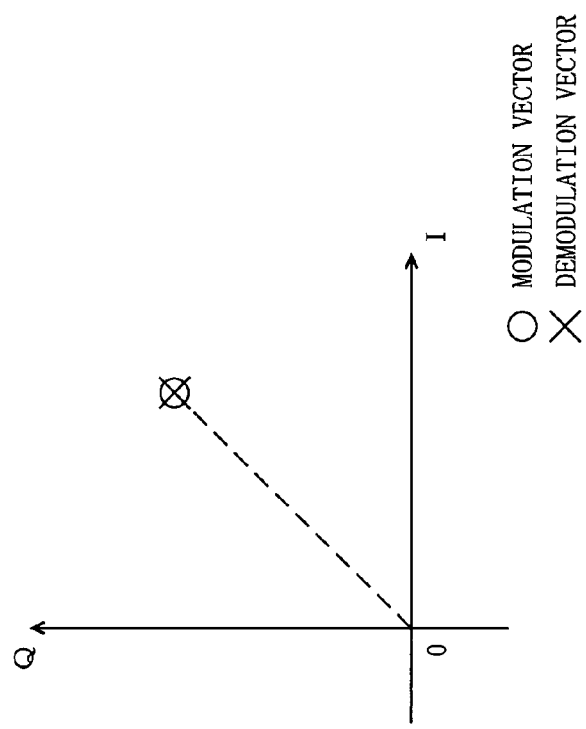
FIG. 15B is a complex plane diagram illustrating a range within which a conventional demodulation vector of OFDM/OQAM multicarrier modulation signals is present.
Figure 15A:
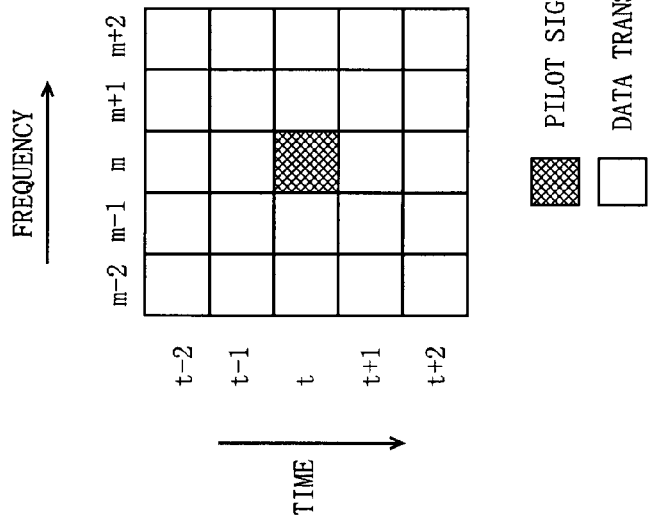
FIG. 15A is a diagram illustrating a portion of a frame format of conventional OFDM/OQAM multicarrier modulation.
Figure 16:
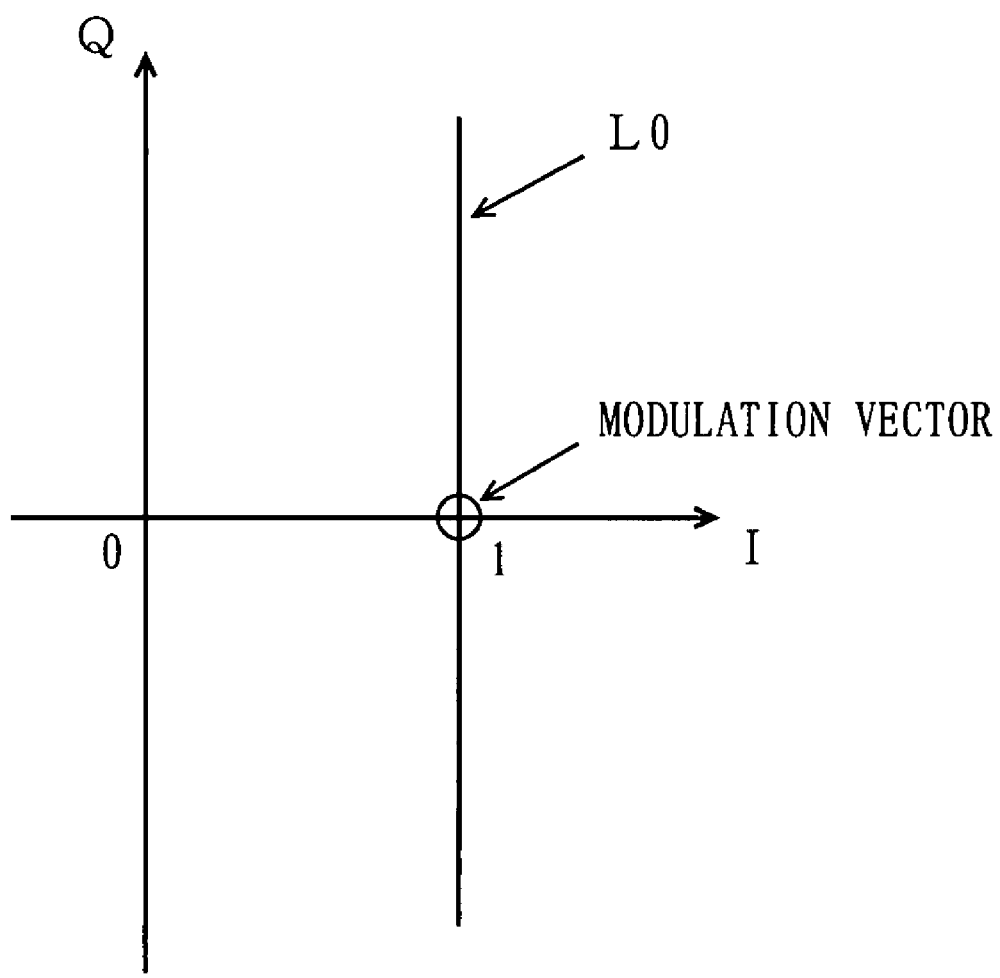
FIG. 16 is a complex plane diagram illustrating a range within which a conventional ideal demodulation vector of OFDM/OQAM multicarrier modulation signals is present.
Figure 17B:
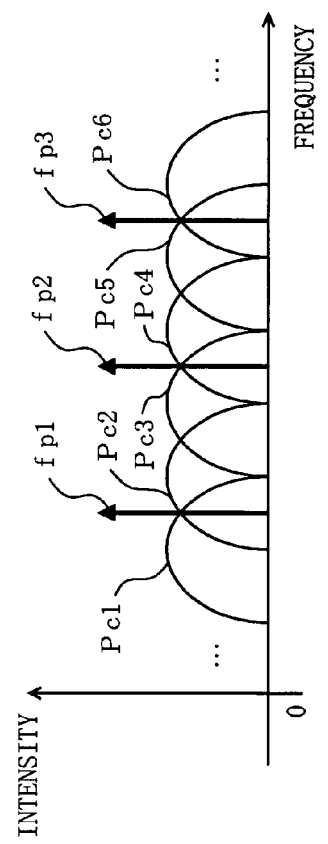
FIG. 17B is a schematic diagram illustrating a relationship in frequency between spectrum of pilot signals and subcarriers.
Figure 17A:
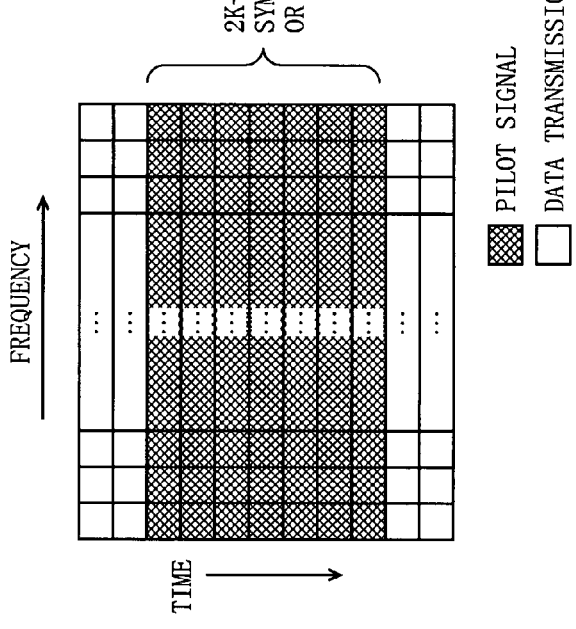
FIG. 17A is a diagram illustrating a portion of a frame format used in a first method of Patent Document 1.
Figure 18:
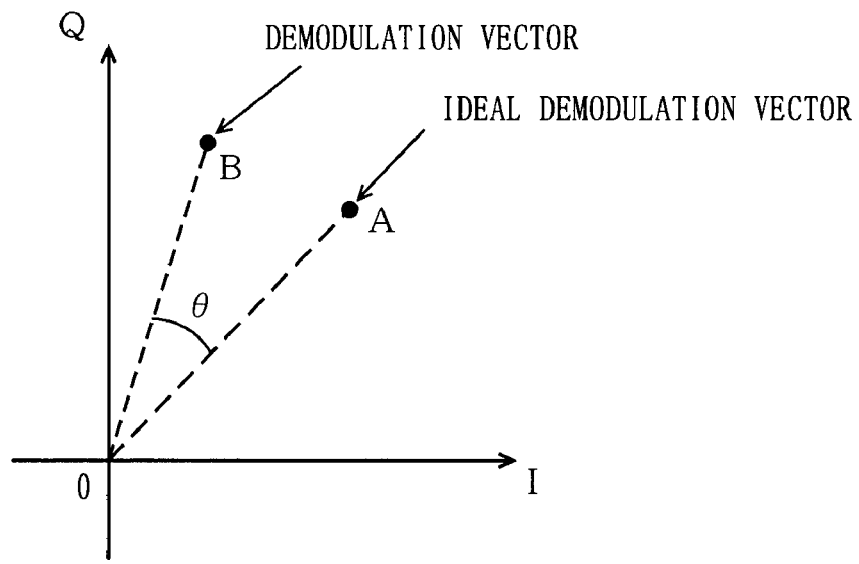
FIG. 18 is a conceptual diagram illustrating a method for estimating transmission channel characteristics in the first method of Patent Document 1.
Figure 19:
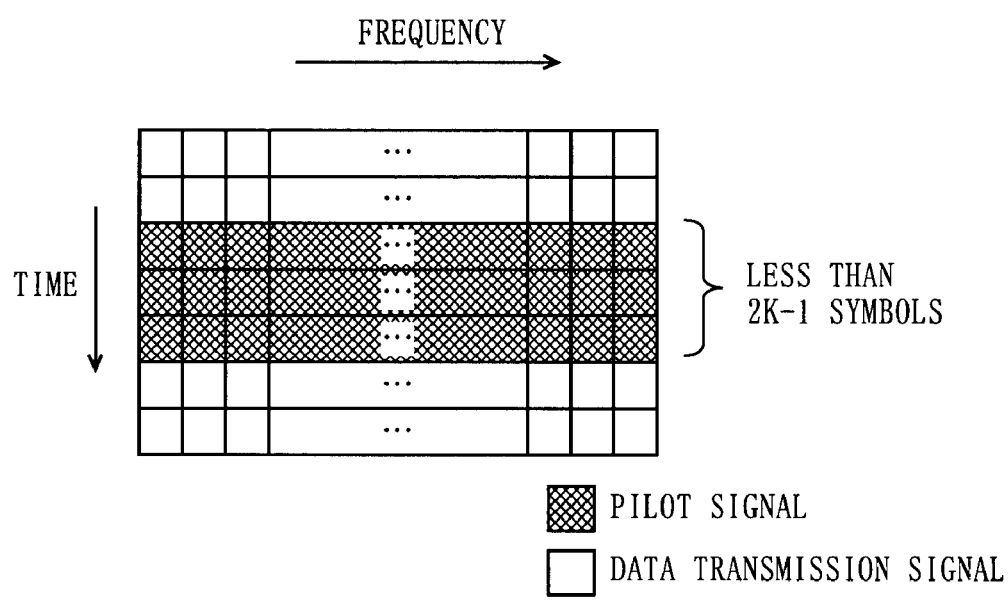
FIG. 19 is a diagram illustrating a portion of a frame format used in a second method of Patent Document 1.
Figure 20:
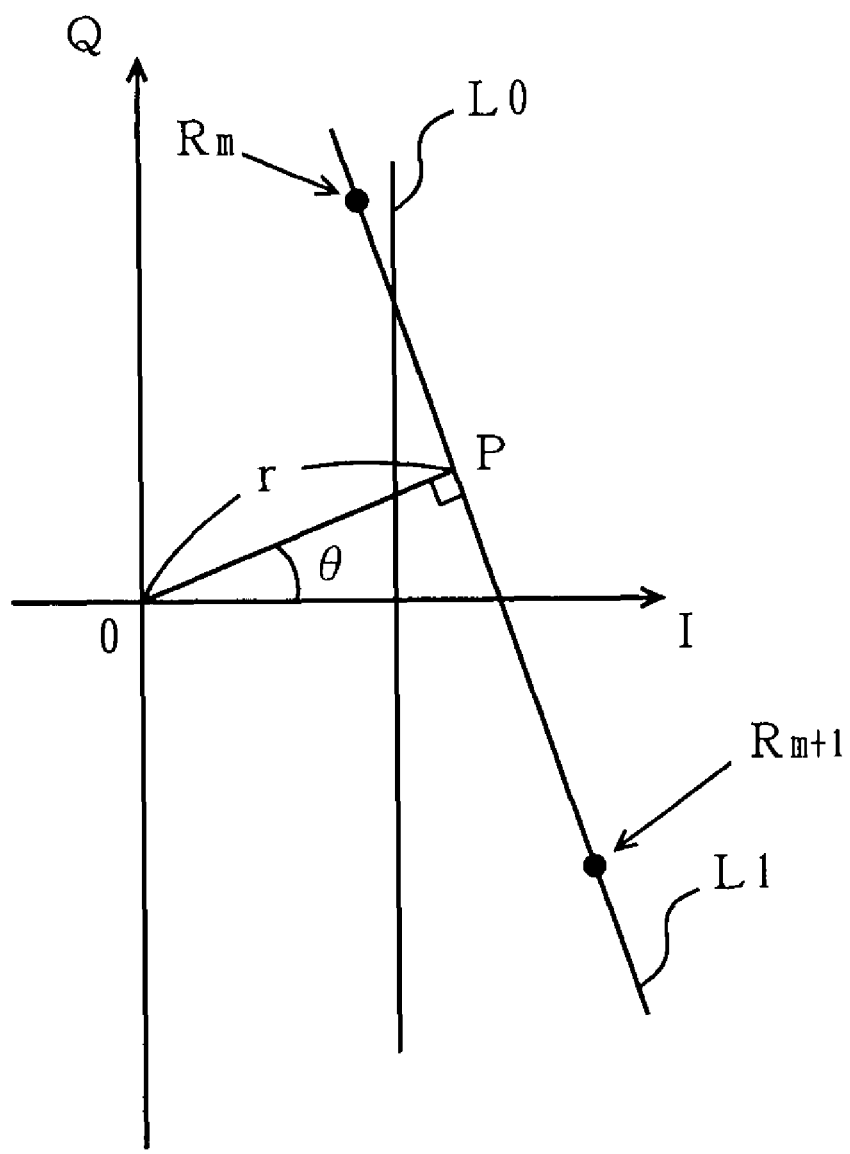
FIG. 20 is a conceptual diagram illustrating a method for estimating transmission channel characteristics in the second method of Patent Document 1.
Figure 21B:
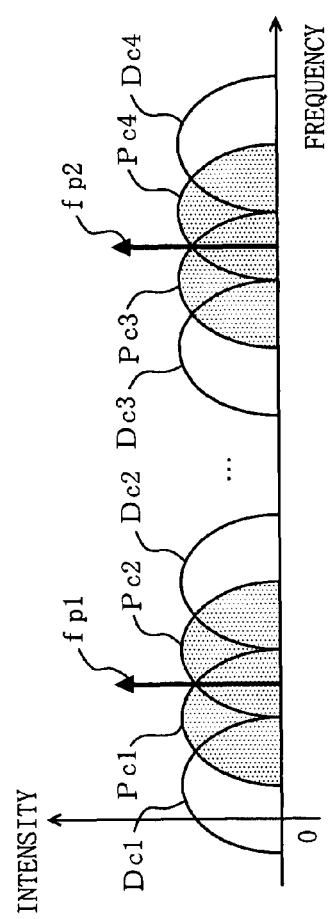
FIG. 21B is a schematic diagram illustrating a relationship in frequency between spectrum of pilot signals and subcarriers.
Figure 21A:
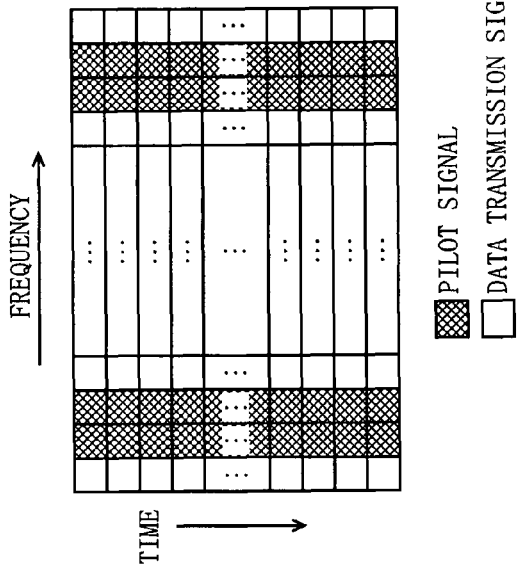
FIG. 21A is a diagram illustrating a portion of a frame format used in Patent Document 2.

FIG. 13 is a diagram illustrating a portion of a frame format in a multicarrier modulation scheme according to a second embodiment of the present invention. In FIG. 13, the horizontal axis represents an arrangement of subcarriers in the frequency direction, and the vertical axis represents an arrangement of symbols in the time direction. Thus, in the multicarrier modulation of the second embodiment, an OFDM/OQAM multicarrier modulation signal is used in which a cycle of reference pilot signal sequence is inserted in a predetermined subcarrier.

As can be seen from the description of FIG. 7, if a cycle (i.e., four symbols) of reference pilot signal sequence is inserted as a pilot signal, the distance between demodulation vectors of second and third symbols in the reference pilot signal sequence can be maximized without depending on data transmission signals overlapping before and after the pilot signal. Therefore, a transmission channel can be estimated based on the demodulation vectors of the pilot signals of the second and third symbols.

As described above, according to the multicarrier modulation of the second embodiment of the present invention, a pilot signal required for estimation of a transmission channel can be constructed using a cycle of reference pilot signal sequence, resulting in a further increase in frequency efficiency.

While the invention has been described in detail, the foregoing description is in all aspects illustrative and not restrictive. It is understood that numerous other modifications and variations can be devised without departing from the scope of the invention.

What is claimed is:

1. A multicarrier transmission method in which a transmitter subjects a plurality of subcarriers orthogonal frequency division multiplexing (OFDM)/offset quadrature amplitude modulation (OQAM), and transmits the amplitude-modulated subcarriers to a receiver, the multicarrier transmission method comprising:

generating and transmitting, by the transmitter, at least one pilot carrier, which is obtained by modulating one subcarrier among a plurality of subcarriers having a relationship ντ=1/2 where τ represents a symbol interval and ν represents a frequency interval, with a signal sequence including a reference pilot signal sequence represented by any of amplitude modulation vectors {α, α, −α, −α}, {α, −α, −α, α}, {−α, α, α, −α}, and {−α, −α, α, α} where α represents a real number other than 0; and estimating, by the receiver, transmission channel characteristics based on two successive pilot signal demodulation vectors in a time direction which are obtained by demodulating the at least one pilot carrier.

2. The multicarrier transmission method of claim 1, wherein the generating and transmitting by the transmitter includes:
generating a pilot signal sequence including the reference pilot signal sequence represented by any of amplitude modulation vectors {α, α, −α, −α}, {α, −α, −α, α}, {−α, α, α, −α}, and {−α, −α, α, α} where α represents a real number other than 0;
constructing a frame signal by inserting the pilot signal sequence into a transmission data signal sequence; and
subjecting the frame signal to multicarrier modulation and transmitting a result as a multicarrier modulation signal.

3. The multicarrier transmission method of claim 2, wherein the estimating of the transmission channel characteristics by the receiver includes:
demodulating the multicarrier modulation signal to generate a demodulation vector;
extracting a demodulation vector corresponding to the pilot carrier as a pilot signal demodulation vector from a plurality of demodulation vectors;
estimating transmission channel characteristics from the pilot signal demodulation vector; and
compensating for the demodulation vector based on the estimated transmission channel characteristics.

4. The multicarrier transmission method of claim 3, wherein the estimating of the transmission channel characteristics from the pilot signal demodulation vector by the receiver includes:
receiving and delaying the pilot signal demodulation vector by one symbol time to generate a delayed pilot signal demodulation vector; and
estimating amplitude and phase change amounts indicating the transmission channel characteristics based on a difference vector between the pilot signal demodulation vector and the delayed pilot signal demodulation vector, and
the compensating for the demodulation vector, by the receiver, includes compensating for an amplitude and a phase of the demodulation vector based on the amplitude and phase change amounts.

5. The multicarrier transmission method of claim 2, wherein the pilot signal sequence is constructed by cycling the reference pilot signal sequence X times where X represents a real number of 1 or more which becomes a natural number when multiplied by 4.

6. A multicarrier modulation signal transmission apparatus for transmitting a multicarrier modulation signal which is obtained by subjecting a plurality of subcarriers to orthogonal frequency division multiplexing (OFDM)/offset quadrature amplitude modulation (OQAM), the multicarrier modulation signal transmission apparatus comprising:
a pilot carrier transmitting section for generating and transmitting at least one pilot carrier, which is obtained by modulating one subcarrier among a plurality of subcarriers having a relationship $\nu\tau=1/2$ where $\tau$ represents a symbol interval and $\nu$ represents a frequency interval, with a signal sequence including a reference pilot signal sequence represented by any of amplitude modulation vectors {α, α, −α, −α}, {α, −α, −α, α}, {−α, α, α, −α}, and {−α, −α, α, α} where α represents a real number other than 0.

7. The multicarrier modulation signal transmission apparatus of claim 6, wherein the pilot carrier transmitting section includes:
a pilot signal sequence generating section for generating a pilot signal sequence including a the reference pilot signal sequence represented by any of amplitude modulation vectors {α, α, −α, −α}, {α, −α, −α, α}, {−α, α, α, −α}, and {−α, −α, α, α} where α represents a real number other than 0;
a frame constructing section for constructing a frame signal by inserting the pilot signal sequence into a transmission data signal sequence; and
a multicarrier modulation signal transmitting section for subjecting the one subcarrier among the plurality of subcarriers having a relationship $\nu\tau=1/2$ where $\tau$ represents a symbol interval and $\nu$ represents a frequency interval, to multicarrier modulation with the frame signal, thereby to generate the at least one pilot carrier, and transmitting the result the at least one pilot carrier.

8. The multicarrier modulation signal transmission apparatus of claim 7, wherein the pilot signal sequence is constructed by cycling the reference pilot signal sequence X times where X represents a real number of 1 or more which becomes a natural number when multiplied by 4.

9. A multicarrier modulation signal reception apparatus for receiving a multicarrier modulation signal which is obtained by subjecting a plurality of subcarriers to orthogonal frequency division multiplexing (OFDM)/offset quadrature amplitude modulation (OQAM), wherein
the multicarrier modulation signal includes at least one pilot carrier modulated, which is obtained by modulating one subcarrier among a plurality of subcarriers having a relationship $\nu\tau=1/2$ where $\tau$ represents a symbol interval and $\nu$ represents a frequency interval, with a signal sequence including a reference pilot signal sequence represented by any of amplitude modulation vectors {α, α, −α, −α}, {α, −α, −α, α}, {−α, α, α, −α}, and {−α, −α, α, α} where α represents a real number other than 0, and
the multicarrier modulation signal reception apparatus comprises:
a transmission channel characteristics estimating section for estimating transmission channel characteristics based on two successive pilot signal demodulation vectors in a time direction which are obtained by demodulating the at least one pilot carrier.

10. The multicarrier modulation signal reception apparatus of claim 9, further comprising:
a multicarrier demodulating section for demodulating the multicarrier modulation signal to generate a demodulation vector;
a pilot signal extracting section for extracting a demodulation vector corresponding to the pilot carrier as a pilot signal demodulation vector from a plurality of demodulation vectors;
a second transmission channel characteristics estimating section for estimating transmission channel characteristics from the pilot signal demodulation vector; and
an amplitude and phase compensating section for compensating for the demodulation vector based on the transmission channel characteristics estimated in the second transmission channel characteristics estimating section.

11. The multicarrier modulation signal reception apparatus of claim 10, wherein the second transmission channel characteristics estimating section includes:
- a delaying section for receiving and delaying the pilot signal demodulation vector by one symbol time to generate a delayed pilot signal demodulation vector; and
- an amplitude and phase change amount estimating section for estimating amplitude and phase change amounts indicating the transmission channel characteristics based on a difference vector between the pilot signal demodulation vector and the delayed pilot signal demodulation vector,
- wherein the amplitude and phase change amount compensating section compensates for an amplitude and a phase of the demodulation vector based on the amplitude and phase change amounts.

12. A multicarrier modulation signal transmission method for in which a transmitter transmits a multicarrier modulation signal which is obtained by subjecting a plurality of subcarriers to orthogonal frequency division multiplexing (OFDM)/ offset quadrature amplitude modulation (OQAM), the multicarrier modulation signal transmission method comprising:
- generating and transmitting, by the transmitter, at least one pilot carrier, which is obtained by modulating one subcarrier among a plurality of subcarriers having a relationship $v\tau=1/2$ where $\tau$ represents a symbol interval and $v$ represents a frequency interval, with a signal sequence including a reference pilot signal sequence represented by any of amplitude modulation vectors $\{\alpha, \alpha, -\alpha, -\alpha\}$, $\{\alpha, -\alpha, -\alpha, \alpha\}$, $\{-\alpha, \alpha, \alpha, -\alpha\}$, and $\{-\alpha, -\alpha, \alpha, \alpha\}$ where $\alpha$ represents a real number other than 0.

13. The multicarrier modulation signal transmission method of claim 12, wherein the generating and transmitting includes:
- generating a pilot signal sequence including a the reference pilot signal sequence represented by any of amplitude modulation vectors $\{\alpha, \alpha, -\alpha, -\alpha\}$, $\{\alpha, -\alpha, -\alpha, \alpha\}$, $\{-\alpha, \alpha, \alpha, -\alpha\}$, and $\{-\alpha, -\alpha, \alpha, \alpha\}$ where $\alpha$ represents a real number other than 0;
- constructing a frame signal by inserting the pilot signal sequence into a transmission data signal sequence; and
- subjecting the one subcarrier among the plurality of subcarriers having a relationship $v\tau=1/2$ where $\tau$ represents a symbol interval and $v$ represents a frequency interval, to multicarrier modulation with the frame signal, thereby to generate the at least one pilot signal, and transmitting the result the at least one pilot signal.

14. A pilot signal generation method in which a transmitter generates a pilot signal included in a multicarrier modulation signal which is obtained by subjecting a plurality of subcarriers to orthogonal frequency division multiplexing (OFDM)/ offset quadrature amplitude modulation (OQAM), the method comprising steps of:
- generating, by the transmitter, a pilot signal sequence including a reference pilot signal sequence represented by any of amplitude modulation vectors $\{\alpha, \alpha, -\alpha, -\alpha\}$, $\{\alpha, -\alpha, -\alpha, \alpha\}$, $\{-\alpha, \alpha, \alpha, -\alpha\}$, and $\{-\alpha, -\alpha, \alpha, \alpha\}$ where $\alpha$ represents a real number other than 0; and
- generating, by the transmitter, a pilot signal by modulating a single subcarrier among a plurality of subcarriers havin a relationship $v\tau=1/2$ where $\tau$ represents a symbol interval and $v$ represents a frequency interval, with the pilot signal sequence.

* * * * *